(12) United States Patent
Canavor et al.

(10) Patent No.: US 10,290,022 B1
(45) Date of Patent: *May 14, 2019

(54) TARGETING CONTENT BASED ON USER CHARACTERISTICS

(71) Applicant: Amazon Technologies, Inc., Seattle, WA (US)

(72) Inventors: Darren Ernest Canavor, Redmond, WA (US); William Alexander Strand, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 547 days.

This patent is subject to a terminal disclaimer.

(21) Appl. No.: 14/747,901

(22) Filed: Jun. 23, 2015

(51) Int. Cl.
*G06Q 30/02* (2012.01)

(52) U.S. Cl.
CPC ..... *G06Q 30/0269* (2013.01); *G06Q 30/0255* (2013.01); *G06Q 30/0257* (2013.01); *G06Q 30/0277* (2013.01)

(58) Field of Classification Search
CPC .......... G06Q 30/0269; G06Q 30/0255; G06Q 30/0257; G06Q 30/0277
USPC ................. 705/14.53, 14.66; 726/6; 709/224
See application file for complete search history.

(56) References Cited

U.S. PATENT DOCUMENTS

| | | | |
|---|---|---|---|
| 5,712,979 A | 1/1998 | Graber et al. | |
| 6,182,142 B1 | 1/2001 | Win et al. | |
| 7,069,271 B1 | 6/2006 | Fadel et al. | |
| 7,085,817 B1 | 8/2006 | Tock et al. | |
| 7,523,191 B1 | 4/2009 | Thomas et al. | |
| 7,698,256 B1 | 4/2010 | Wang et al. | |
| 7,747,782 B2 | 6/2010 | Hunt et al. | |
| 7,774,782 B1 | 8/2010 | Popescu et al. | |
| 8,234,348 B1 | 7/2012 | Tulchinsky et al. | |
| 8,510,810 B2 | 8/2013 | Solin et al. | |

(Continued)

OTHER PUBLICATIONS

Jakobsson et al., "Privacy-Preserving History Mining for Web Browsers", [online] RSA Laboratories, 2008 Retrieved from the Internet: <URL: http://www.arijuels.com/wp-content/uploads/2013/09/JJR08.pdf>, 7 pages.

(Continued)

*Primary Examiner* — Tarek Elchanti
(74) *Attorney, Agent, or Firm* — Kilpatrick Townsend & Stockton LLP

(57) ABSTRACT

Techniques for providing targeted content may be described. In particular, a network-based document may be provided to a computing system of a user in response to a request for information. The network-based document may include the information, an identifier of another network-based document, and code. The code may be configured to, upon execution, determine whether the other network-based document was accessed prior to providing the network-based document. An indication that the other network-based document was accessed may be determined. For example, the indication may be received based on an execution of the code at the computing system. The user may be associated with a user characteristic based on the indication. Further, targeted content may be provided to the computing system based on the user being associated with the user characteristic.

19 Claims, 13 Drawing Sheets

(56) References Cited

U.S. PATENT DOCUMENTS

| | | | |
|---|---|---|---|
| 8,850,010 B1 | 9/2014 | Qureshi | |
| 8,850,567 B1 | 9/2014 | Hsieh et al. | |
| 8,856,869 B1 | 10/2014 | Brinskelle | |
| 2002/0065912 A1 | 5/2002 | Catchpole et al. | |
| 2002/0099936 A1 | 7/2002 | Kou et al. | |
| 2002/0162009 A1 | 10/2002 | Shmueli et al. | |
| 2003/0009533 A1 | 1/2003 | Shuster | |
| 2003/0033545 A1 | 2/2003 | Wenisch et al. | |
| 2003/0229900 A1 | 12/2003 | Reisman et al. | |
| 2004/0073867 A1 | 4/2004 | Kausik et al. | |
| 2004/0098493 A1 | 5/2004 | Rees et al. | |
| 2004/0098609 A1 | 5/2004 | Bracewell et al. | |
| 2005/0015624 A1 | 1/2005 | Ginter et al. | |
| 2005/0229119 A1 | 10/2005 | Torvinen et al. | |
| 2006/0059225 A1 | 3/2006 | Stonehocker et al. | |
| 2007/0094081 A1* | 4/2007 | Yruski | G06Q 30/02 705/14.66 |
| 2007/0226062 A1 | 9/2007 | Hughes et al. | |
| 2008/0195632 A1 | 8/2008 | Le Rouzic et al. | |
| 2009/0019525 A1 | 1/2009 | Yu et al. | |
| 2009/0043874 A1 | 2/2009 | Kim et al. | |
| 2009/0055642 A1 | 2/2009 | Myers et al. | |
| 2009/0089869 A1 | 4/2009 | Varghese | |
| 2009/0144451 A1 | 6/2009 | Cabezas et al. | |
| 2009/0265344 A1 | 10/2009 | Etoh et al. | |
| 2009/0276835 A1 | 11/2009 | Jackson et al. | |
| 2009/0313261 A1 | 12/2009 | Corella | |
| 2010/0024015 A1* | 1/2010 | Hardt | H04L 67/14 726/6 |
| 2010/0057843 A1 | 3/2010 | Landsman et al. | |
| 2010/0064234 A1 | 3/2010 | Schreiber et al. | |
| 2010/0138477 A1 | 6/2010 | Hanus | |
| 2010/0138485 A1 | 6/2010 | Chow et al. | |
| 2010/0161385 A1 | 6/2010 | Karypis et al. | |
| 2011/0004623 A1 | 1/2011 | Sagara et al. | |
| 2011/0022938 A1 | 1/2011 | Wilkinson et al. | |
| 2011/0035784 A1 | 2/2011 | Jakobsson | |
| 2011/0055912 A1 | 3/2011 | Fusari et al. | |
| 2011/0145398 A1* | 6/2011 | Bansal | G06Q 30/02 709/224 |
| 2011/0197136 A1 | 8/2011 | Duke et al. | |
| 2011/0314128 A1 | 12/2011 | Blumenau et al. | |
| 2013/0054675 A1 | 2/2013 | Jenkins et al. | |
| 2013/0133072 A1 | 5/2013 | Kraitsman et al. | |
| 2013/0138506 A1 | 5/2013 | Zhu et al. | |
| 2013/0218865 A1 | 8/2013 | Angulo et al. | |
| 2013/0290865 A1 | 10/2013 | Kageyama | |
| 2014/0032691 A1 | 1/2014 | Barton et al. | |
| 2014/0046938 A1 | 2/2014 | Li et al. | |
| 2014/0058945 A1 | 2/2014 | Stecher et al. | |
| 2014/0122720 A1 | 5/2014 | Jung et al. | |
| 2014/0189808 A1 | 7/2014 | Mahaffey et al. | |
| 2014/0279793 A1 | 9/2014 | Wohlstadter | |
| 2014/0325596 A1 | 10/2014 | Edwards et al. | |
| 2014/0344890 A1 | 11/2014 | Warrick et al. | |
| 2015/0019324 A1 | 1/2015 | Schler | |
| 2015/0033297 A1 | 1/2015 | Sanso et al. | |
| 2015/0052584 A1 | 2/2015 | Rudraraju | |
| 2015/0082438 A1 | 3/2015 | Alvarez et al. | |
| 2015/0237120 A1 | 8/2015 | Jiang et al. | |
| 2015/0288522 A1 | 10/2015 | Mccoy et al. | |
| 2015/0288673 A1 | 10/2015 | Dou et al. | |
| 2015/0288770 A1 | 10/2015 | Owens | |
| 2015/0347683 A1 | 12/2015 | Ansari et al. | |

OTHER PUBLICATIONS

Stone , "Pixel Perfect Timing Attacks with HTML5", [online] Context Information Security Research, Jul. 2013 Retrieved from the Internet: https://www.contextis_com/documents/2/Browser_Timing_Attacks.pdf, 29 pages.

U.S. Appl. No. 14/747,880, filed Jun. 23, 2015, Titled: User Tracking Based on Client-Side Browse History.

U.S. Appl. No. 14/747,919, filed Jun. 23, 2015, Titled: User Authentication Using Client-Side Browse History.

U.S. Appl. No. 14/747,939, filed Jun. 23, 2015, Titled: Detecting a Network Crawler.

Dabrowski et al., "Browser History Stealing with Captive Wi-Fi Portals", Mobile Security Technologies (MoST), Available online at https://www.sba-research.org/wp-content/uploads/publications/Dabrowski2016Browser.pdf, May 26, 2016, 27 pages.

Juels et al., "Cache Cookies for Browser Authentication", IEEE Computer Society, Available online at http://citeseerx.ist.psu.edu/viewdoc/download?doi=10.1.1.137.8258&rep1&type=pdf, May 2006, 15 pages.

* cited by examiner

TARGETING CONTENT BASED ON USER CHARACTERISTICS

CROSS-REFERENCE TO RELATED APPLICATIONS

This application is related to and incorporates by reference for all purposes the full disclosure of co-pending U.S. patent application Ser. No. 14/747,880, filed Jun. 23, 2015, entitled "USER TRACKING BASED ON CLIENT-SIDE BROWSE HISTORY", co-pending U.S. patent application Ser. No. 14/747,919, filed Jun. 23, 2015, entitled "USER AUTHENTICATION USING CLIENT-SIDE BROWSE HISTORY", and co-pending U.S. patent application Ser. No. 14/747,939, filed Jun. 23, 2015, entitled "DETECTING A NETWORK CRAWLER".

BACKGROUND

Users may operate computing devices to access various resources and services provided over a network. For example, a user may access a web site and browse various pages of a service provider.

The service provider may provide additional services to improve the user's experience. For example, the browsed web pages may be customized. In another example, a login web page may be set up to authenticate the user and allow user access to specific functions. In a further example, a web crawler may crawl the web site and access information. The service provider may limit the crawling to certain portions of the web site by using, for instance, a robots exclusion protocol. As such, different services may be configured and provided based on the user. However, if the user may not have been properly identified, some of the services may be inaccessible.

BRIEF DESCRIPTION OF THE DRAWINGS

Various embodiments in accordance with the present disclosure will be described with reference to the drawings, in which.

DETAILED DESCRIPTION

Figure 1:
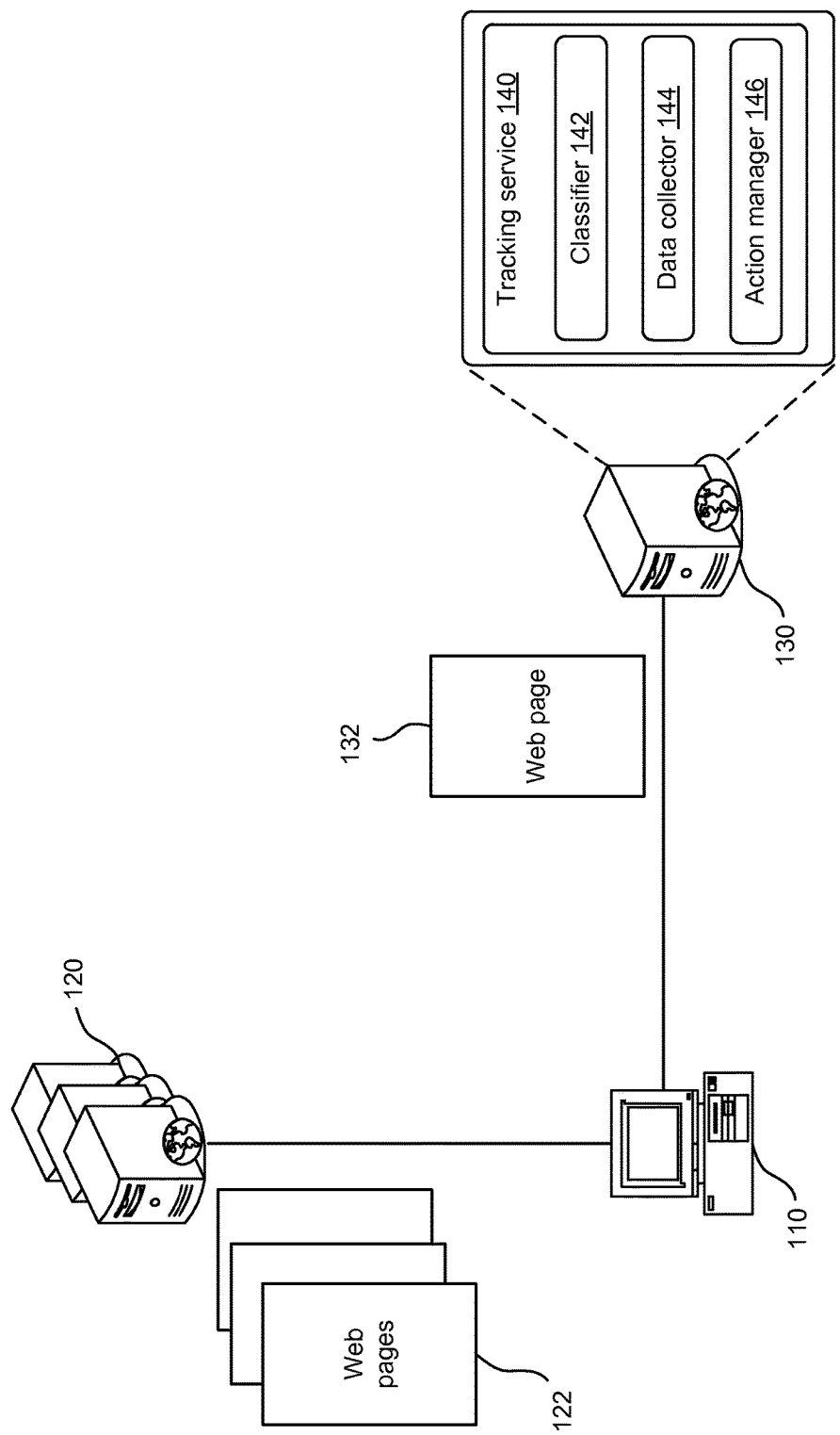
FIG. 1 illustrates an example environment for providing a network-based service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a network-based service. In particular, a service provider may maintain a network-based resource (e.g., a web site) that may include a plurality of network-based documents (e.g., web pages). The service provider may also implement a tracking service associated with the network-based resource. The tracking service may be configured to de-anonymize a user of a computing device (e.g., a client device) accessing the network-based resource and, accordingly, provide a network-based service. For example, the tracking service may be configured to analyze user actions, identify a user characteristic, and provide one or more network-based services based on the user characteristic. In turn, the user may operate an application on the computing device to request a network-based document over a network. Network-based documents previously accessed by the user (e.g., by the computing device) may be determined from storage associated with the application. This determination may involve, for example, the tracking service inserting identifiers of the network-based documents and code in the requested network-based document. The code may be configured to, upon execution at the computing device (e.g., by the application), access the storage and determine whether the network-based documents may have already been visited based on the identifiers. As such, upon providing the network-based document to the computing device and upon an access thereto by the application, the code may be executed. In turn, the tracking service may receive an indication about the previous accesses. Based on the indication, the tracking service may associate the user with a user characteristic. The user characteristic may represent a potential characteristic of the user based on the previous accesses. Further, the tracking service may provide a network-based service to the computing device based on the user characteristic. For example, targeted content may be provided. In another example, the user may be authenticated. In yet another example, the application may be detected as being a network crawler.

To illustrate, consider an example of a web site associated with an electronic marketplace. The electronic marketplace may be configured to offer different items. Upon a request from a computing device of a user for information about an item, a tracking service of the electronic marketplace may insert, in a web page describing the item, a universal resource locator (URL) of another web page and a particular JavaScript. The other web page may be associated with metadata describing a potential user characteristic. A browser of the computing device may render the web page. When the web page is rendered, the URL may not be visible to the user. Further, the rendering may cause the JavaScript to execute. The executed JavaScript may access the browser's history and determine whether the URL may be in the history, a state of the URL (e.g., a visited state), or a style attribute of the URL (e.g., underlined and purple). Accordingly, the JavaScript may generate an indication of whether the other web page may have been accessed prior to receiving the web page describing the item. The tracking service may receive the indication. Based on this indication and the metadata, the tracking service may associate the user with the user characteristic. Further, the tracking service may cause a particular action to be initiated based on the associated user characteristic. For example, if the user characteristic indicates that the user may be a shopper having a particular behavior, an advertisement affined to that behavior may be inserted in a widget of the web page. In another example, if the user characteristic indicates an authenticated user identifier, the user may be authenticated. In yet another example, if the user characteristic indicates a characteristic of a web crawler, the user may be detected as being the web crawler.

The various embodiments may be described in association with providing computing services to a user, such as associating the user with a user characteristic, classifying the user, providing targeted content to the user, authenticating the user, determining whether the user is associated with a web crawler, and other computing services. Providing such computing services may include providing the computing services to a computing device of the user, a user account of the user, or other hardware, software, and/or electronic entities associated with the user.

In the interest of the clarity of explanation, the various embodiments may be described using example web sites, web pages, universal resource locators, JavaScript, and browsers. However, the embodiments are not limited as such. Instead, the embodiments may similarly apply to any network-based resource, network-based document, identifiers, codes, and applications. In particular, a network-based resource may represent a resource hosted on one or more computing nodes and available for access over a network. Generally, a network-based resource may be configured to provide a service over the network. For example, the network-based resource may include a collection of network-based documents. A network-based document may represent an electronic document that may be available for access over a network. Generally, the electronic document may include information. The electronic document may or may not be a structured document. An identifier may facilitate identifying one or more network-based documents. For example, the identifier may include a network address of the network-based document(s) or a link to the network-based document(s) over a network. When an identifier is inserted in a structured document to identify an address of another network-based document, the identifier may be added to the electronic document as an object, or some other element, of the structure of the document. Generally, the identifier may have various states (e.g., visited, activated, hovered over) and various attributes (e.g., a style attribute defining a color). An attribute value (e.g., a specific color) may depend on a state (e.g., a visited state). A code may represent code, such as a script, configured to perform certain actions. The script may include statements of a programmatic scripting language in accordance with an ECMAScript standard, such as a JavaScript, JScript, and ActionScript. For example, the code may be configured to track user actions, to analyze tracked actions, to access storage associated with an application, or any other programmable actions. An application may represent a program that may be hosted and executed on a computing device to perform certain functions. An example function may include accessing or rendering network-based documents. Storage associated with the application, or more generally with the computing device, may store information about the performed functions, such as information about identifiers of the accessed and/or rendered network-based documents.

Further, a user may represent a human being or may represent a machine or a process. For example, a user may include a shopper operating a computing device to surf and purchase items from a web site. In another example, the user may include a computing device accessing the web site, or a web crawler hosted on the computing device and accessing the web site.

A web page (or more generally a network-based document) may include information. That information on its own may represent an item. Additionally or alternatively, the information may be about an item. This item may be tangible (e.g., a physical product or a digital product offered from an electronic marketplace) or intangible (e.g., a service).

Turning to FIG. 1, an example environment for providing a network-based service is illustrated. The network-based service may include providing any or a combination of targeted content, user authentication, or web crawler detection.

In particular, a user may operate a computing device 110 (e.g., a client device or a computing system of a client) to access one or more servers 120 (or other types of computing resources) over a network. The servers 120 may host one or more web sites of one or more service providers. Each web site may include a collection of web pages. A web page may provide information or describe an item.

The computing device 110 may host a browser (or another application) that may access one or more web pages 122 provided from the servers 120. In an example, the browser may, but need not, render an accessed web page. Each of the web pages 122 may be associated with a URL. A history of the browser may store URLs of accessed web pages. For example, the history may store the URLs of the web pages 122 with state and/or attribute information. State information may describe a state associated with a URL, such as whether the URL was accessed, visited, or other states. Attribute information may describe an attribute associated with a URL. An attribute may include a style attribute. For example, the attribute may include a purple color (or any other color) and an underline style (or any other style effect) to indicate a visited URL. The history may be stored at local storage of the computing device 110.

At some point after accessing the web pages 122, the computing device 110 may connect to the server 130 (or another type of computing resource) over a same or a different network. The server 130 may host a web site. In an example, the web site may be associated with one of the one or more service providers. In this example, the web site may be one of the web sites providing the web pages 122 and/or the server 130 may be one of the servers 120. In another example, the web site may be associated with a different service provider. A request for a web page 132 from the web site hosted on the server 130 may be received. Accordingly, the web page 132 may be provided to the computing device 110 for, for example, rendering by the browser.

In an example, the server 130 may also host a tracking service 140. The tracking service 140 may represent a computing service configured to de-anonymize the user of the computing device 110. For example, the tracking service may be configured to track and analyze user actions, classify the user actions based on the analysis, and perform various actions based on the classification. In particular, the tracking service 140 may classify, in connection with providing the web page 132, the user of the computing device 110. The classification may be based on the visited web pages 122. Once the user is classified, the tracking service 140 may enable customizing the web page 132, customizing another web page provided to the computing device 110 from the server 130, and/or perform another action as further described herein.

In an example, the tracking service 140 may include various modules to provide the above functionalities. In particular, the tracking service may include a classifier 142, a data collector 144, and an action manager 146. Generally, the classifier 142 may be configured to facilitate classifying the user based on associating the user (or an identifier of the user) with a user characteristic. For example, the classifier 142 may maintain a collection of URLs of interest and respective metadata. The collection may organize the URLs in a list. Metadata of a URL may describe a potential user characteristic of users having accessed or accessing a web page corresponding to the URL. An example of the classifier 142 is further illustrated in FIG. 2. Classifying the user may involve adding the user (or the identifier thereof) to a group of users having that user characteristic.

Figure 3:
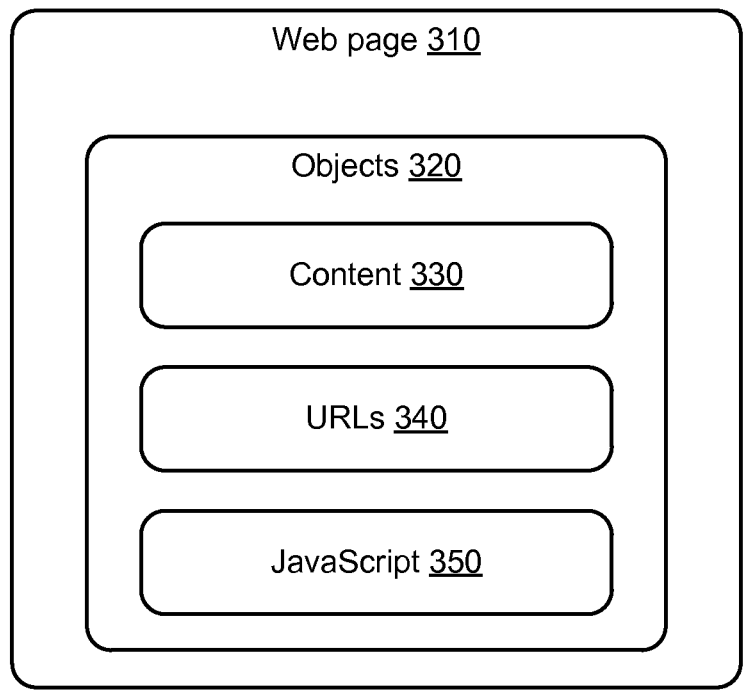
FIG. 3 illustrates an example of data collection usable as a part of providing a network-based service, according to embodiments.
Figure 4:
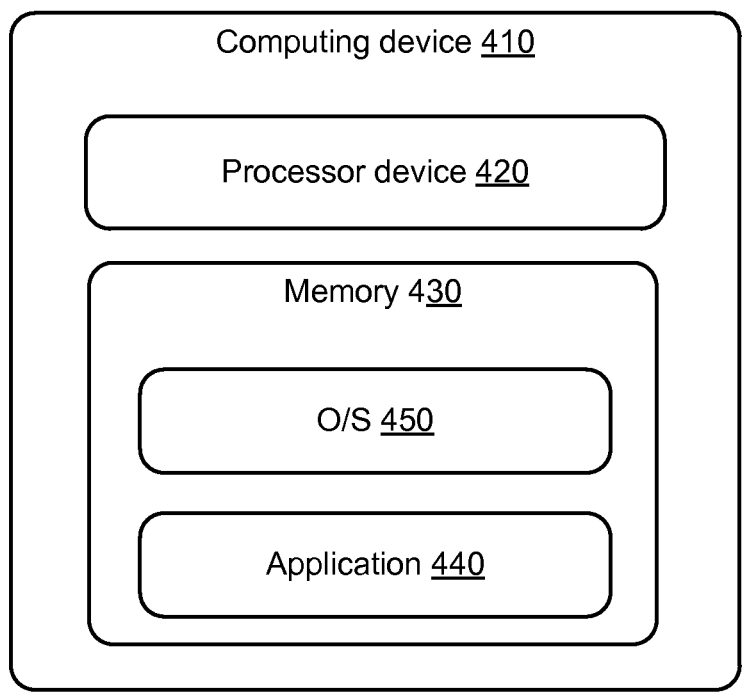
FIG. 4 illustrates another example of data collection usable as a part of providing a network-based service, according to embodiments.

The data collector 144 may be configured to enable the tracking service 140 to collect data about user actions, such as what web pages may have been previously visited (e.g., the web pages 122). The collected data may be analyzed in light of the classifier 142 to classify the user. Various techniques may be implemented by the data collector 144 to collect the data. In one example technique, URLs of interest (e.g., ones maintained by the classifiers 142) may be inserted in the web page 132 along with a JavaScript (or any other statements of a suitable scripting language). The JavaScript may be configured to, upon execution, access the browser's history from the local storage of the computing device 110, determine whether web pages corresponding to the URLs of interest may have been accessed, and generate an indication accordingly. FIG. 3 further illustrates this technique. In another technique, information from the history may be provided to the tracking service 140 by an application of the operating system of the computing device 110 over a pre-define communication channel. FIG. 4 further illustrates this technique.

The action manager 146 may be configured to allow the tracking service 140 to perform (e.g., initiate, initiate and perform, or cause performance of) certain actions based on the classification of the user. For example, each user characteristic (e.g., as defined in the classifier 142) may be associated with one or more actions. The associations may be maintained by the action manager 146 (and/or the classifier 142). As such, based on classifying the user as having a particular user characteristic, the tracking service 140 may perform the associated action(s).

Figure 7:
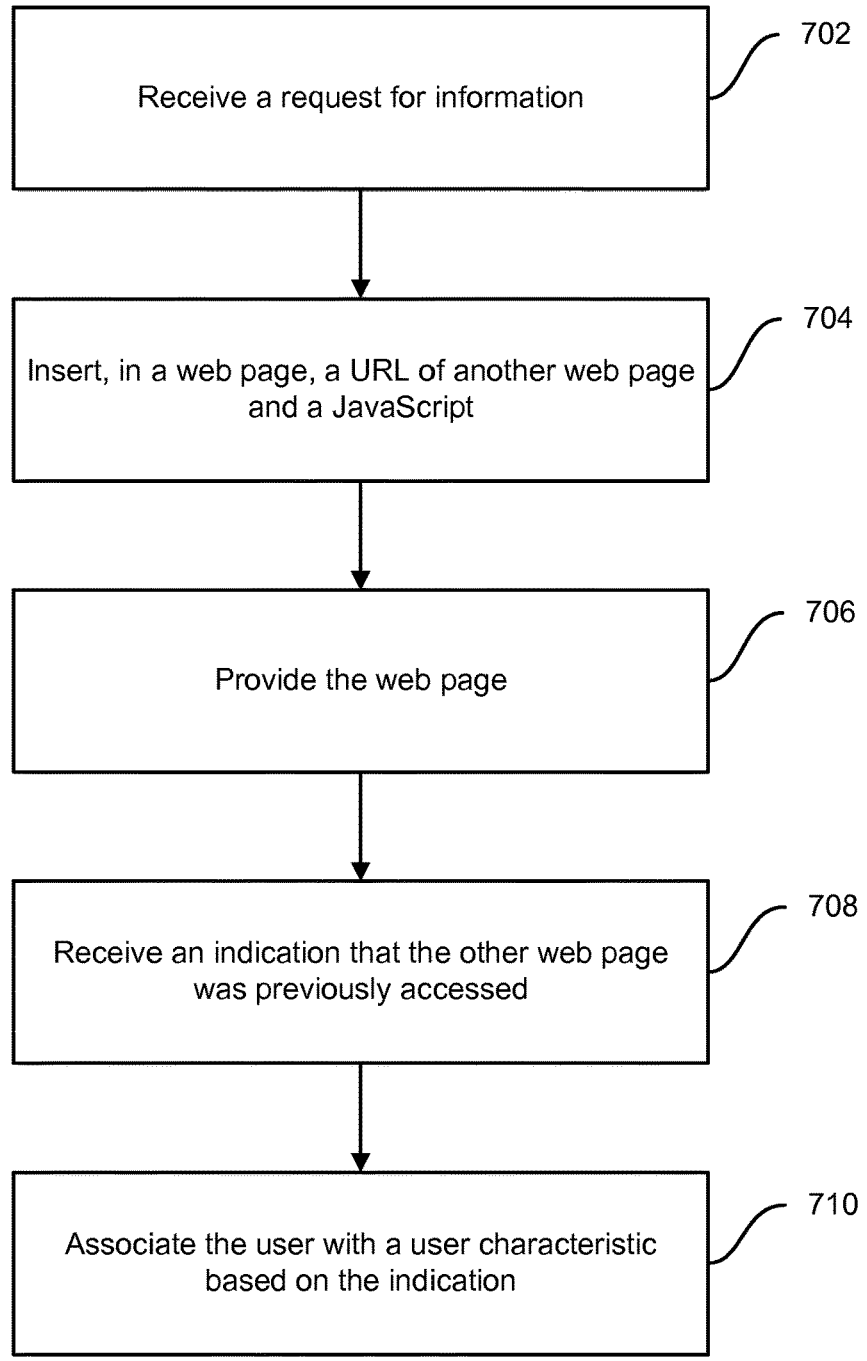
FIG. 7 illustrates another example flow for providing a network-based service based on a user characteristic, according to embodiments.
Figure 8:
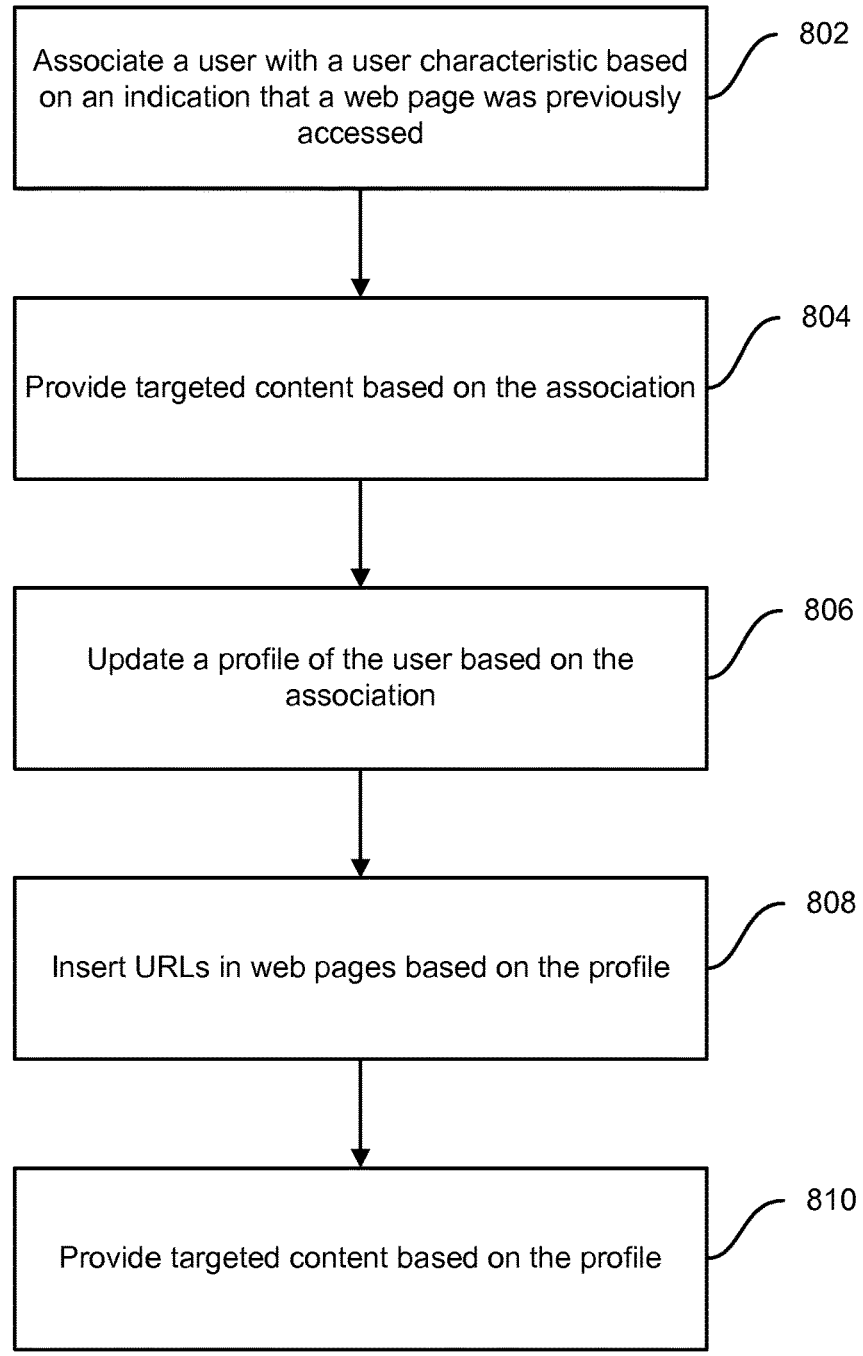
FIG. 8 illustrates another example flow for providing targeted content as a network-based service, according to embodiments.

An example action may include customizing the web page 132, or another web page provided from the server 130. The customization may reflect the associated user characteristic. For example, the customizing may include providing targeted content (e.g., advertisement) based on the user characteristic. The targeted content may be inserted in a widget, banner, or other presentation spaces of the provided web page from the server 130. FIGS. 7 and 8 further illustrate example processes that may be implemented to perform such actions.

Figure 9:
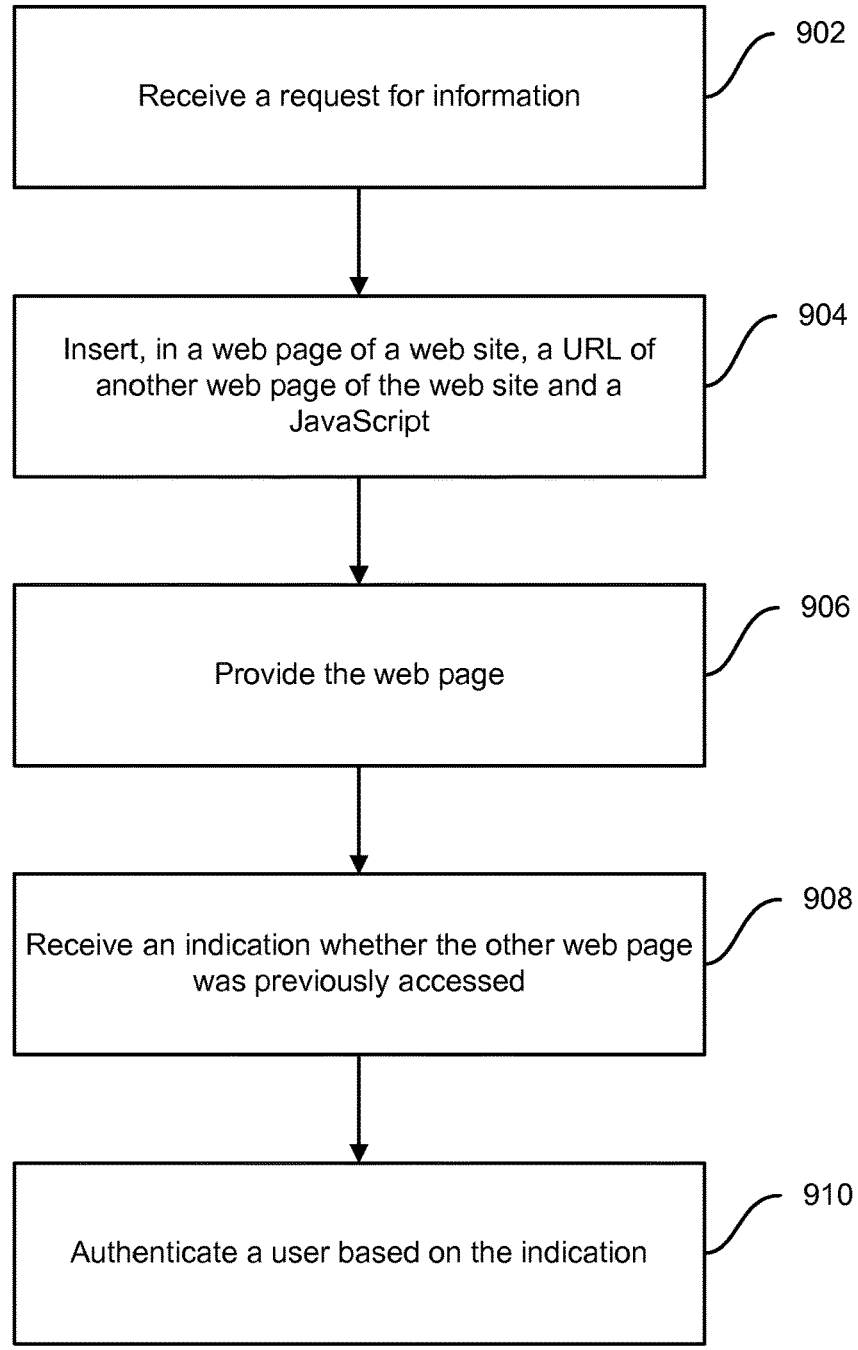
FIG. 9 illustrates another example flow for authenticating a user as a network-based service, according to embodiments.

Another example action may include authenticating the user. In particular, the user may be associated with an identifier (e.g., a user ID). That identifier may be used in connection with accessing the web page 132. Based on the classification of the user, the tracking service 140 may validate the identifier, thereby authenticating the user (or providing another layer of authentication). FIG. 9 further illustrates an example process that may be implemented to perform such actions.

Figure 10:
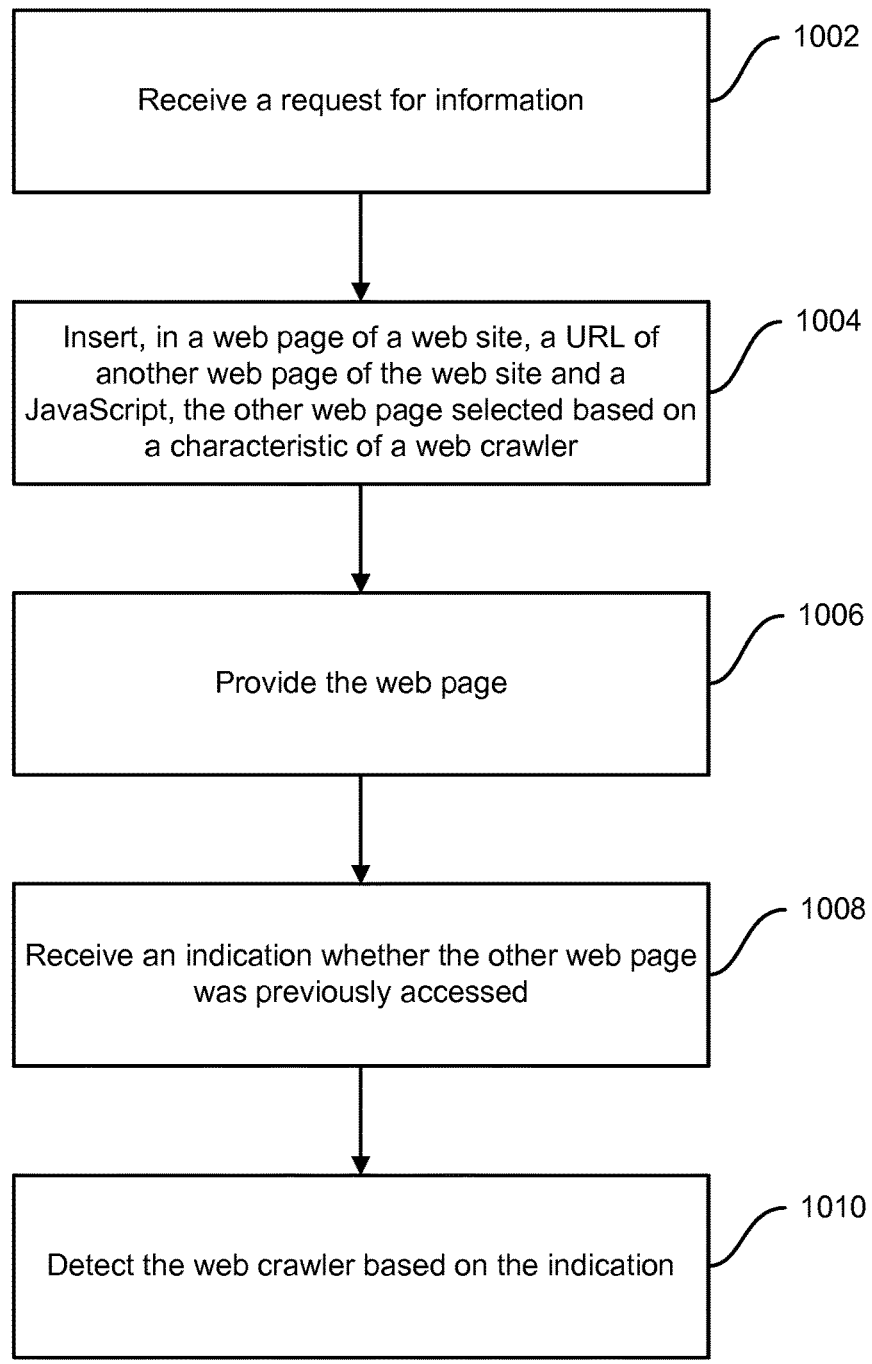
FIG. 10 illustrates an example flow for detecting a network crawler as a network-based service, according to embodiments.

Yet another example action may include detecting whether the user may be a web crawler. The web crawler may represent a network crawler, network bot, Internet bot, or a botnet. In other words, the web may be configured to access and browse web pages for various purposes (legal and/or malicious) including, for example, scraping content, indexing, or other purposes. Based on the classification of the user (e.g., indicating that the user may have previously accessed a web page that only a web crawler would have accessed, the tracking service 140 may detect that the user may be the web crawler. Accordingly, the tracking service 140 may enable alleviating network traffic associated with providing information to the computing device 110 (hosting the web crawler). For instance, text but not image data may be provided, or the data may be sent from a proxy server, or via a particular application programming interface (API). FIG. 10 further illustrates an example process that may be implemented to perform such actions.

In one embodiment, the tracking service 140 may be hosted on the computing device 110. For example, the browser (or any other application) may add the tracking service 140 as an extension. In this embodiment, the computing device 110 may locally classify the user and perform an action. As such, even when the computing device 110 is offline or not connected to the server 130, various actions may nonetheless be performed. From time to time, an update to the tracking service 140 may be received from the server 130. The update may change any of the components of the tracking service 140 including the classifier 142, the data collector 144, and/or the action manager 146. In another embodiment, the tracking service 140 may be distributed between the computing device 110, the server 130, other servers, and/or other computing nodes and resources. For example, instances of the tracking service 140 may be hosted on both the computing device 110 and the server 130. In another example, the classifier 142 and the data collector 144 may be hosted on the computing device 110, while the action manager may be hosted on the server 130.

Hence, by implementing a tracking service, such as the tracking service 140, a service provider of a web site may determine whether a user accessing a web page of the web site may have previously accessed other web pages of the same web site or of other web sites. Based on the previous accesses, the user may be classified as having a particular user characteristic. In turn, a particular action may be performed over a network according to the user characteristic.

Figure 2:
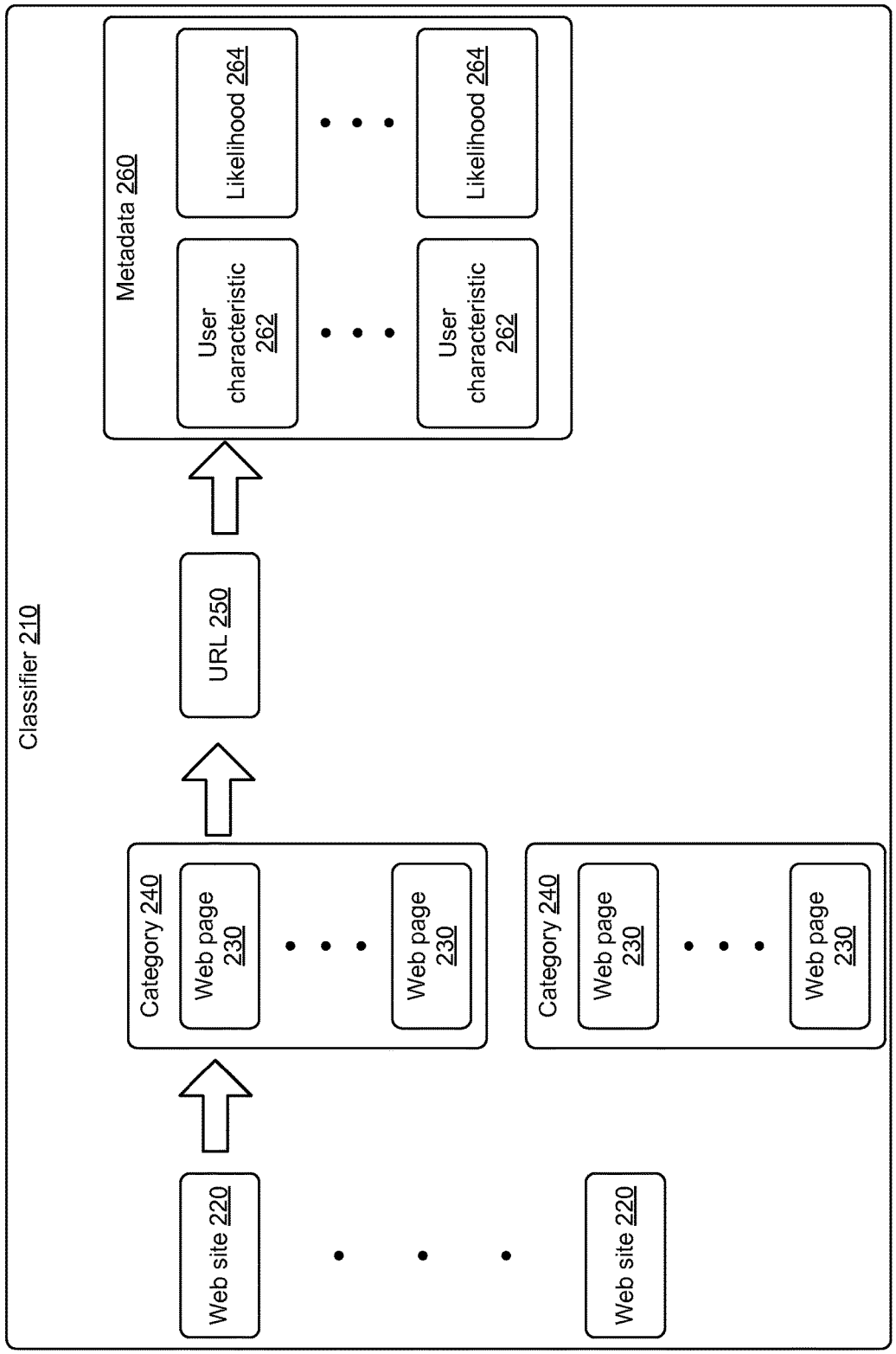
FIG. 2 illustrates an example classifier usable as a part of providing a network-based service, according to embodiments.

A classifier, similar to the classifier 142, may facilitate classifying a user by associating the user with a user characteristic. FIG. 2 illustrates an example of the classifier. As illustrated, a classifier 210 may maintain a collection of information (e.g., a list) that may identify one or more web sites 220. The web sites 220 may include web sites of interest to a service provider. For example, a web site of interest may be that of another service provider, such as a web site offering similar information or describing similar items as the web site of the service provider. In another example, a web site of interest may be the web site of the of the service provider. The web sites 220 may be identified using different techniques including, for example, a domain name, a URL of a particular web page (e.g., a home page), or an Internet protocol (IP) address.

For each of the web sites 230, the classifier 210 may also maintain a collection of information (e.g., a list) that may identify web pages 230. The web pages 230 may include web pages of interest to the service provider. That interest may vary based on the web page's service provider (or web site) and a desired action to be performed. For example, a web page of interest may represent a web page of another service provider providing information or describing an item that may also be available from a web page of the service provider. In another example, a web page of interest may represent a particular web page of the service provider, such as a login page for authentication a user or a web page typically inaccessible to a web crawler. The web pages 230 may be identified using different techniques including, for example, respective URLs.

Further, the classifier 210 may organize the web pages of interest per category 240. Each category may represent a particular interest of the service provider. For example, one category may represent web pages of other service providers, while another category may represent web pages of the service provider. Within each category, there may be a number of sub-categories. For example, one sub-category may represent web pages describing items belonging to a particular item category (e.g., web pages about digital single-lens reflex (DSLR) cameras). Another sub-category may represent web pages describing a particular item (e.g., web pages about a specific DSLR camera model). The hierarchy of categories may be repeated at several levels. The lower the level, the more particular the service provider's interest may be.

The classifier 210 may also maintain associations between the URLs (or the web pages) and metadata. Metadata associated with a URL may describe one or more potential user characteristics of a user that may have used the URL (e.g., operated a computing device to access the respective web page). For example, the classifier 210 may identify a URL 250 for each web page. In turn, the classifier may maintain metadata 260 that may describe one or more user characteristics 262 and one or more respective likelihoods 264 for each URL. A likelihood may represent the probability of a user having the corresponding user characteristic if the URL associated with the metadata is used.

The user characteristic 262 and the likelihood 264, and more generally the metadata 260, may be determined from historical data. The historical data may include clickstreams of users. The clickstreams may be based on user accesses to the web site of the service provider or to web sites of other service providers. In particular, the clickstreams used to generate the metadata 260 for the URL 250 may include clickstreams associated with using the URL 250, accessing the respective web page, and performing various traceable user actions thereat. In another example, the clickstreams may be associated with using a different URL (and a different web page). In this example, the clickstreams related to the different URL may be used to generate the metadata 260 associated with the URL 250 based on a rule. The rule may apply a similarity. In particular, the two web pages may be similar for the clickstreams to be usable. Similarity may be based on providing the same or similar (e.g., having overlapping or equivalent) information or describing the same or similar (having common or equivalent features) item(s). For example, the two web pages may describe the same item, but may be associated with different web sites.

Hence, a classifier, such as the classifier 210, may be configured to maintain a collection of URLs of interest and associated metadata. The URLs may identify web pages and/or web sites of interest. The metadata may describe user characteristics and likelihoods of users having these characteristics based on accesses to the web pages and/or web sites of interest.

The classifier may be used to classify the user as having one or more user characteristics. This classification may consider a history of accesses to web pages, such as the web pages that the user may have visited. This history may be collected by a data collector, such as the data collector 144. In particular, the data collector may implement various techniques to collect the data. FIG. 3 illustrates one example technique. This technique may insert URLs of interest in a web page and a JavaScript, executable when the web page is rendered at a computing device, to access a browser's history of the computing device and determine if the URLs of interest have been previously used. In comparison, FIG. 4 illustrates another example technique, where the history may be received without the need to use the JavaScript. The example techniques of FIGS. 3 and 4 may be used separately or in conjunction.

Turning to the details of FIG. 3, an example web page 310 may be configured to facilitate a determination of whether a browser's history of a computing device may include accessed or visited web pages of interest. The web page 310 may be associated with a web site of a service provider. Further, the web page 310 may be provided to the browser from a server in response to a request for the web page 310.

The web page 310 may include a set of objects 320 written using certain language, such as HTML, XML, or another language. The objects 320 may be organized in a document object model (DOM). An object may represent an element or a component of the web page 310 and may include information. When the browser renders the web page 310, the object may be rendered or cause certain actions to be performed. As such, the objects 320 may include headers, tags, elements, and/or different markup language objects.

In an example, the objects 320 may include content 330. The content 330 may describe an item or provide information and may include text, images, multimedia, or other information. The objects 320 may also include URLs 340. The URLs 340 may represent URLs of interest and may correspond to web pages of interest. These URLs may be selected from a collection of URLs maintained by a classifier. The objects may also include a JavaScript 350 (or any other script or object) configured to cause the computing device (or the browser) to perform certain actions when rendering the web page 310. These actions may include accessing the browser's history, determining whether the history may include the URLs 340 of interest, a state and/or a style attribute of an included URL of interest, generating an indication of this determination, and/or opening a socket to transmit the indication to a server (e.g., one hosting a tracking service, such as the tracking service 140). In an example, an indication may include a portion of the history, such as the found URLs of interest and the associated states and/or style attributes. In another example, an indication may include a description that a URL of interest may have been found.

When the web page 310 is rendered, the URLs 340 may not be visible to a user. For example, the URLs 340 may be included in tags of elements configured not to be rendered. In another example, the URLs may be rendered as a small component (e.g., a one by one pixel) and/or may be rendered in an out-of-display portion of the rendered web page 310 (e.g., in an invisible frame). This may help against biasing the user to the visit the corresponding web pages by presenting the URLs 340 to the user. Similarly, executing the JavaScript 350 and/or resulting actions may also be transparent to the user. For example, the execution may run in the background.

As such, when the computing device (e.g., the browser) accesses the web page 310, the computing device may also use, execute, or run the JavaScript 350 in conjunction with the URLs 340 of interest to generate and provide the indication to the server. In other words, by configuring the web page 310 to include the URLs 340 and a JavaScript 350, the service provider may turn computing devices of users accessing the web page 310 (or various web pages of the service provider's web site) effectively into sensors that may collect information about a history of accesses to web pages of interest.

The above technique may collect the history of accessed or visited web pages of interest based on inserting URLs of interest and a JavaScript in a web page. Other techniques for collecting this data may also be used. In particular, FIG. 4 illustrates collecting the data from the browser's history without the need to use the JavaScript.

As illustrated in FIG. 4, an example computing device 410 may be configured to provide a history of accessed web pages or an indication of such accesses to a server of a service provider (e.g., one hosting a tracking service, such as the tracking service 140). In an example, the data collection may be enabled only if the service provider has permission to access the data.

The permission may be provided by a user (e.g., an owner, an administrator) of the computing device 410. Additionally or alternatively, the service provider may also be a provider of the computing device 410 and may have a certain permitted degree of control over the computing device. In such a case, the computing device 410 and the server may be connected over an out-of-band channel. The out-of-band channel may represent a network path to a privately accessible resource of the service provider. This resource may represent a control plane that may include, for example, a platform for providing control and other functions from the server to the computing device 410. As such, the out-of-band channel may allow the service provider to control and provide certain functions of the computing device 410, such as to download software updates, remote access, and other functions. Because of this control, the out-of-band channel may be available to transmit data about the history of web page accesses.

In particular, the computing device 410 may execute an application 440 configured to perform various actions including, for example, collecting the history and/or generating the indication based on local storage of the computing device 410 (e.g., the history of a browser and/or other application). The application 440 may interface or integrate with the browser and/or the other application. In an example, the application 440 may include the browser, a browser plug-in, or an application independent of the browser. For instance, the application 440 may be included in an operation system 450 of the computing device 410. Further, the application 440 may be triggered to perform one or more of the actions. These actions may include accessing the local storage of the computing device 410, accessing domain name service (DNS) records, accessing browser's history, determining whether the history and/or records may include URLs of interest, a state and/or a style attribute of an included URL of interest, generating an indication of the determination, and/or transmitting the indication to the server. The transmission may use the out-of-band channel.

Additionally, the application 440 may run in the background and may, at time intervals, perform the one or more actions. The application 440 may be available on the computing device 410 at a time prior to a user obtaining the computing device 410, or may be installed on the computing device 410 after such a time from a data store of the service provider. The service provider may further push updates and other information to the application 440 from time to time over, for example, the out-of-band channel.

As such, by configuring the computing device 410 to include the application 440, a service provider may turn the computing device effectively into a sensor to collect information associated with accesses to web pages. The collected information may be used to provide various services.

Figure 5:
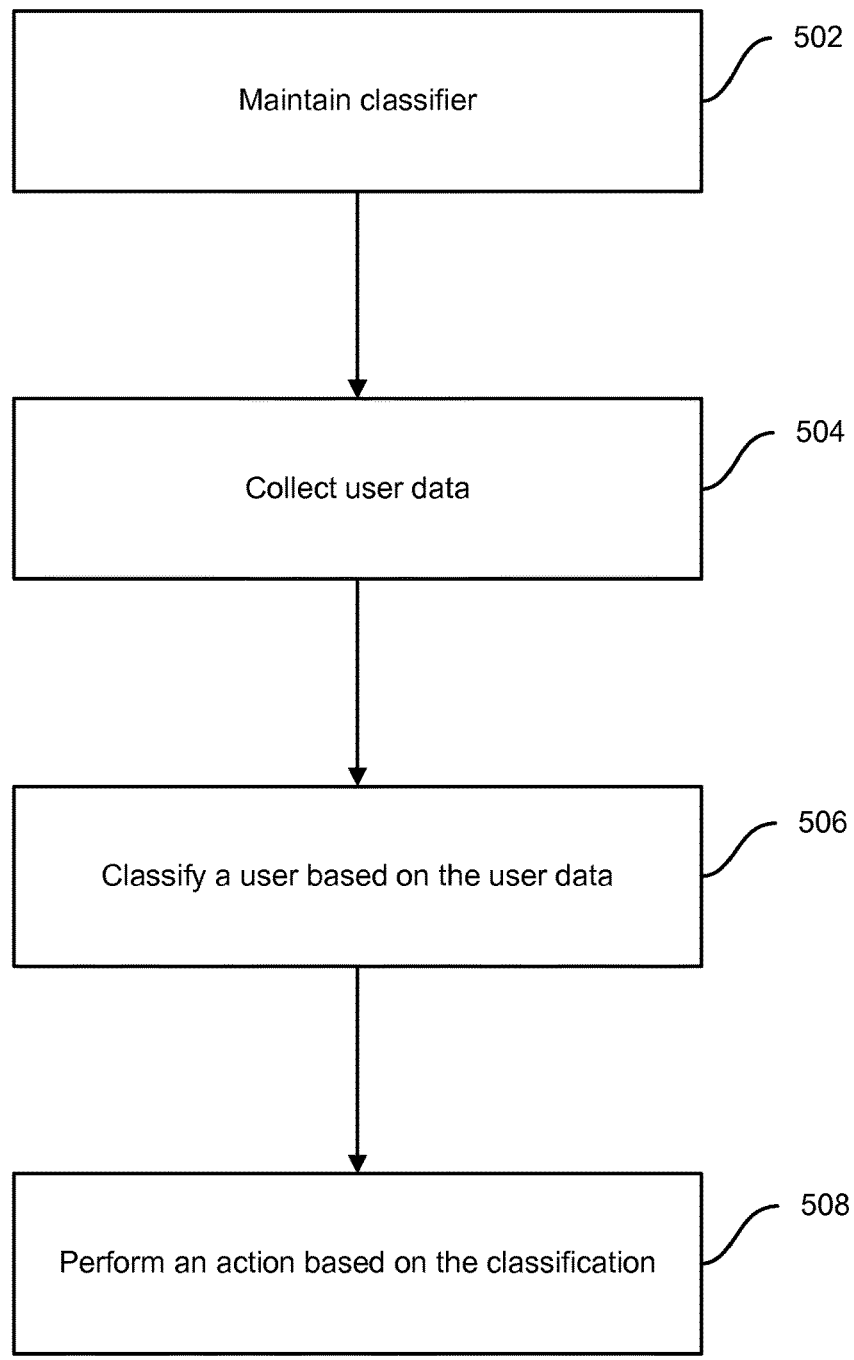
FIG. 5 illustrates an example flow for providing a network-based service, according to embodiments.
Figure 6:
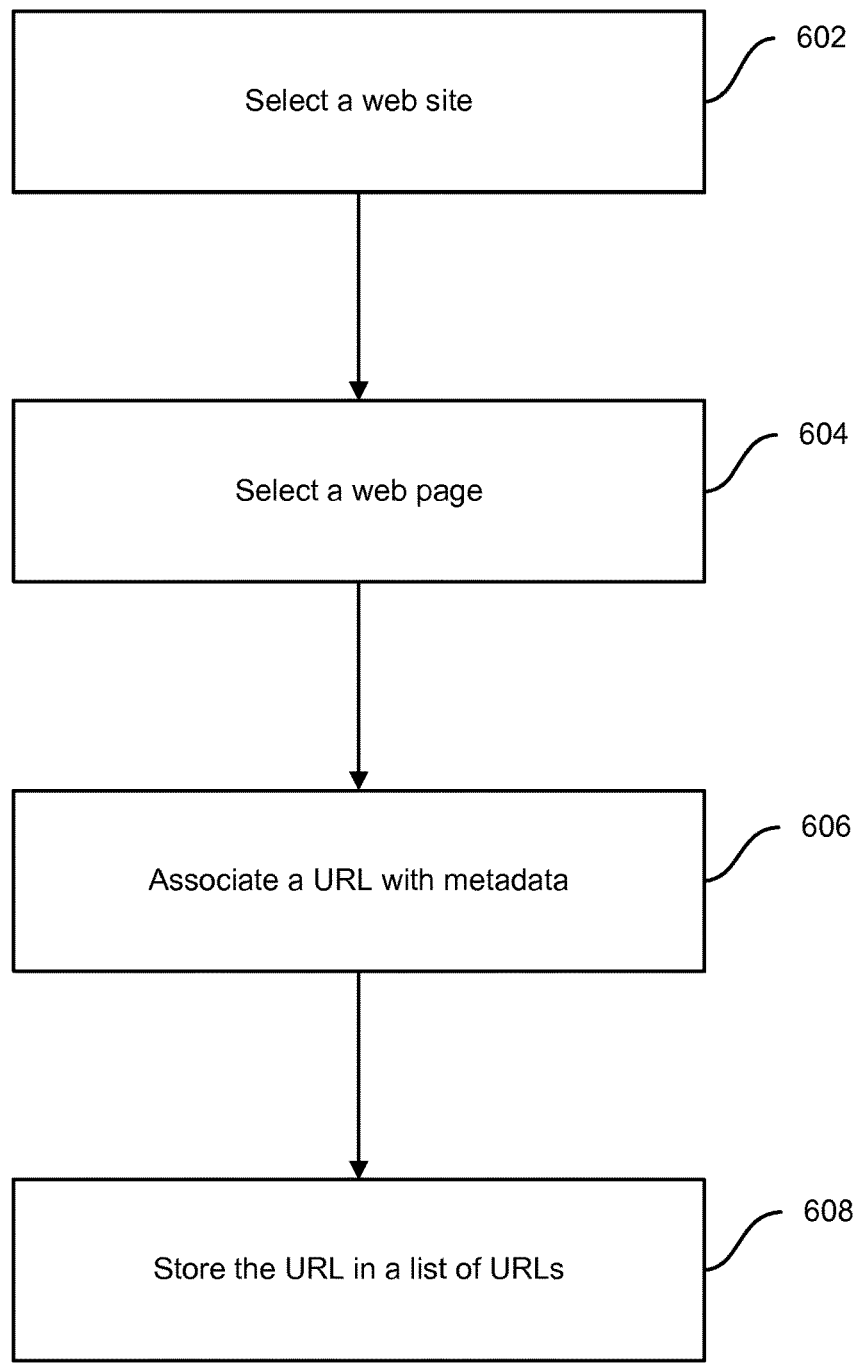
FIG. 6 illustrates an example flow for maintaining a classifier, according to embodiments.

Turning to FIGS. 5-10, the figures illustrate example flows for providing different web services (or, more generally, network-based services) based on a detected history of accesses to web pages (or, more generally, network-based documents). In particular, FIG. 5 illustrates an example flow for providing the web services. In comparison, FIG. 6 illustrates maintaining a classifier that may be used as a part of providing a web service. FIG. 7 illustrates providing a web service based on a user characteristic. FIG. 8 illustrates providing targeted content as a web service. FIG. 9 illustrates authenticating a user as a web service. FIG. 10 illustrates detecting a web crawler as a web service. Some operations across the example flows may be similar. Such similarities are not repeated herein in the interest of clarity of explanation.

In the illustrative operations, some of the operations or functions may be embodied in, and fully or partially automated by, components, modules, and/or services executed by one or more processors. For example, a tracking service, such as the tracking service 140, hosted on a computing resource may be configured to perform some or all of the operations. The tracking service may be implemented on behalf of a service provider of a web site. Nevertheless, other computing resources and services, either alone or in combination, may be additionally or alternatively used. Also, while the operations are illustrated in a particular order, it should be understood that no particular order is necessary and that one or more operations may be omitted, skipped, and/or reordered.

In the interest of clarity of explanation, the example flows of FIGS. 5-10 illustrate determining if a history of access to web pages may include an access to a particular web page of interest. Nevertheless, the embodiments described herein are not limited as such. Instead, the embodiments may similarly apply to a higher number of web pages of interest. In addition, some of the operations of the example flows of FIGS. 5-10 may include inserting a single URL in a web page and executing a JavaScript. Nevertheless, the embodiments described herein are not limited as such. Instead, the embodiments may similarly apply to inserting a plurality of URLs before, in conjunction with, or after executing the JavaScript. Further, the insertion and execution may be performed dependently of each other, independently of each other, separately from each other, and/or by different components or services.

Turning to FIG. 5, the example flow may start at operation 502, where a classifier may be maintained. For example, the tracking service may store a collection (e.g., a list) of URLs of interest and associated metadata. From time to time or continuously, the tracking service may update the collection to include additional URLs, delete existing URLs, or update the metadata. An example flow for maintaining the classifier is further illustrated in FIG. 6.

At operation 504, user data may be collected. For example, the tracking service may collect data describing a history of access of a user (or the user's computing device) to web pages. The data may include one or more indications of the access, or may include the history itself. The web pages may be web pages of interest corresponding to some or all of the URLs of interest maintained at the classifier. Some of the web pages may have been previously visited. In an example, a web page may have been previously visited based on an interest of the user (e.g., the user operating the computing device to access the web page). In another example, a web page may have been previously visited without an explicit knowledge of the user. For instance, in response to a previous request for a different, the web page may have been also provided to the computing device. The computing device's browser may have rendered this web page in an invisible frame. In this example, the web page may represent a web page unique to the user and usable to authenticate the user.

Various techniques may be used to collect the data. In a first technique, the tracking service may insert a number of URLs of interest and a JavaScript in a requested web page from the computing device, as illustrated in FIG. 3. In a second technique, the tracking service may receive the data from an application of the computing device, as illustrated in FIG. 4. In the interest of explanation, FIGS. 6-10 illustrate example flows that may implement the first technique. However, the second technique may be similarly implemented separately or in conjunction with the first technique. In particular, once the data is collected, the tracking service may similarly classify the user based on the classifier and perform certain actions based on the classification, regardless of which technique may have been implemented to collect the data.

At operation 506, the user may be classified based on the collected data. For example, the tracking service may determine whether a particular web page of interest may have been previously accessed based on the collected data. The tracking service may access metadata associated with a URL of that web page from the classifier. The Metadata may indicate a user characteristic based on the previous access. Accordingly, the tracking service may classify the user based on the user characteristic.

At operation 508, an action may be performed based on the classification. Performing the action may include initiate, initiate and perform, or cause performance of the action. For example, user characteristics maintained by the classifier may be associated with actions. One set of actions may include providing targeted content. Another set of actions may include authenticating the user. Yet another set of actions may include detecting whether the user may be a web crawler. The tracking service may accordingly perform one of the actions corresponding to the user characteristic applicable to the user, as determined at operation 506. To illustrate, if the user characteristic indicates that the user may be a shopper having a particular behavior, an advertisement affined to that behavior may be provided. In another example, if the user characteristic indicates an authenticated user, the user may be authenticated. In yet another example, if the user characteristic indicates a characteristic of a web crawler, the user may be detected as being the web crawler.

The tracking service may use data maintained by a classifier to collect certain data and to perform certain actions. FIG. 6 illustrates an example flow for maintaining the classifier. In particular, the example flow may start at operation 602, where a web site may be selected. The web site may represent a web site of interest. That interest may vary based on the action to be performed. For example, to provide targeted content, the web site of interest may be that of another service provider (e.g., of a competitor offering similar items available from the service provider's web site). To authenticate a user or detect a web crawler, the web site of interest may be that of the service provider.

At operation 604, a web page may be selected. The web page may represent a web page of interest. Similar to operation 602, the interest may vary based on the action to be performed. For example, to provide targeted content, the web page of interest may be that of a particular item or a particular item category. The targeted content may be associated with that item or item category. For instance, the targeted content may be an advertisement about the item. In another example, to authenticate a user, the web page of interest may be a web page configured to validate an identifier of the user. For example, this web page may be one that may be unique to the user or that may be accessible to the user only after authentication (e.g., after logging in through a login web page). In yet another example, to detect a web crawler, the web page of interest may be a web page configured to be likely accessed only by the web crawler (or likely accessed by non-web crawlers). Thus, if such a web page is accessed (or not), the web crawler may be detected. Examples of the different web pages of interest are further illustrated in FIGS. 7-10.

At operation 606, a URL of the web page of interest may be associated with metadata. The metadata may describe a user characteristic and a likelihood of a user having accessed the web page to exhibit such a user characteristic. For example, if the web page of interest is selected to authenticate the user or detect the web crawler, the user characteristic may be of an authenticated user or a web crawler, respectively. On the other hand, if the web page of interest is selected to provide targeted content, the user characteristic may describe a characteristic of the user such as a trait, an interest, occupation, hobby, or other characteristics.

In an example, the various user characteristics and likelihoods may be determined from historical data associated with accesses to the web page of interest or to a similar web page (e.g., a web page of the service provider describing the same item that the web page of interest may describe). Machine learning algorithms, pattern recognition techniques, and/or regression models may be applied to the historical data to derive the user characteristics and the likelihoods. A user characteristic may be set as characteristic observed from the historical data at a frequency that may exceed a threshold. The likelihood of the user characteristic may be a function of the frequency. In another example, the historical data may be associated with an item described in the web page of interest. In turn, the item may be associated with a user characteristic. To illustrate, if the web page describes a camera of certain complex and advanced features, the associated user characteristic may be that of a "professional" photographer.

At operation 608, the URL of the web page of interest may be stored in a list of URLs. These URLs may correspond to other web pages of interest for which metadata may have been similarly derived as described at operation 602-

604. The URL may also be stored in connection with the respective metadata. For example, the metadata itself may include the URL.

The tracking service may update the classifier from time to time or continuously by, for example, analyzing additional historical data, adding new URLs, removing other URLs, and/or updating the metadata. The tracking service may also use the classifier to classify a user and, accordingly, perform an action. FIG. 7 illustrates an example flow for classifying a user and performing an action. In the interest of the clarity of explanation, the illustrated action includes providing targeted content. However, the example flow may be implemented similarly to perform any or a combination of other actions, such as authenticating the user or detecting a web crawler as further illustrated in FIGS. 9 and 10.

The example flow of FIG. 7 may start at operation 702, where a request for information may be received. For example, the user may operate a computing device to use a browser and request the web page from the web site of the service provider. The web site may be hosted on a server. The computing device's access to the web site may occur via a computing session with the server. The computing session may be associated with an identifier (e.g., a session ID). Additionally or alternatively, the user may be associated with an identifier (e.g., a user ID). The session ID and/or the user ID may be used for various reasons as further illustrated in the next operations.

At operation 704, a URL of another web page and a JavaScript, may be inserted in the web page. For example, the tracking service may select a URL of interest from a list of URLs maintained by a classifier. The tracking service may insert this URL along with the JavaScript as objects in the web page.

The URL of interest may be selected using various techniques. In one technique, the selection may be random. In another technique, the selection may be deterministic based on one or more contexts. For example, the user ID may be associated with a user profile. The selected URL may be based on this profile, as further illustrated in FIG. 8. In another example, the session ID may be associated with a clickstream of the user. The clickstream may indicate a browsing for a particular type of an item or for an item category. The selected URL may correspond to a web page about that item, item type, or item category. In yet another example, the selected URL may correspond to a particular web page of another service provider similar to the web page of the service provider. This particular web page may include similar information, a portion of the information, or describe a same item relative to the web page of the service provider. In a further example, the service provider may have a particular interest in certain web pages of other service providers. The selected URL may be based on this interest and may correspond to one of these web pages.

At operation 706, the web page may be provided from the server to the computing device in response to the request for information. In turn, the browser of the computing device (or some other application) may render the web page. When the web page is rendered, the inserted URL may not be rendered or be visible to the user. Further, the rendering may include executing the JavaScript. As such, the history of previously accessed or visited web pages may be determined. If the history includes the URL of interest and/or if the state or the style attribute of this URL indicates that the URL was used (e.g., the other web pages accessed or visited) prior to the web page being provided, an indication of this prior access may be generated.

At operation 708, the indication may be received. For example, the tracking service may receive the indication via a socket. The indication may include a description (e.g., a flag) of whether the URL of interest may have been previously used (e.g., the flag set to "yes" or some other value if so; otherwise, set to "no" or a default value). In another example, the indication may include a portion of the browsing history. In yet another example, the indication may be received only if the URL was previously used.

At operation 710, the user may be associated with a user characteristic based on the indication. For example, if the indication indicates that the user has previously used the URL of interest and accessed the corresponding web page, the tracking service may associate the user (or the user ID) with the user characteristic. The tracking service may determine the user characteristic from the metadata associated with the URL of interest and maintained at the classifier.

A user profile may also be maintained for the user. For example, the user profile may be a part of a user account at the web site of the service provider. As such, when the user is associated with the user characteristic, the tracking service may update the user profile to also include the user characteristic and, optionally, the respective likelihood. In an example, this update may be based on the user ID. Over time, the user profile may be updated with different user characteristics based on a history of accesses to web pages of interest. The tracking service may use information from the user profile (e.g., the added or updated user characteristics) to select what URLs of interest may be inserted in web pages provided to the user's computing device and/or to further refine the information (e.g., the selected targeted content) provided in computing sessions between the computing device and the server. FIG. 8 illustrates an example flow that may use the user profile.

In particular, the example flow of FIG. 8 may start at operation 802, where the user (or the user ID) may be associated with the user characteristic based on an indication that a web page was previously accessed. This association may implement some or all of the operations of the example flow of FIG. 7.

At operation 804, targeted content may be provided to the user's computing device based on the association. By associating the user with the user characteristic, the tracking service may have classified the user in a group of users that may share that user characteristic. This classification may enable various actions to be performed, including providing the targeted content. The targeted content may be content (e.g., advertisement) of the service provider. For example, the content may relate to an item available for ordering from the web site of the service provider. The targeted content may be selected from available content based on various parameters. For example, the targeted content may be selected based on being associated with the group of users or based on having a particular affinity to the user characteristic. To illustrate, if the user characteristic indicates that the user may have a particular hobby, the targeted content may be an advertisement for an item that may relate to the hobby. In another example, the targeted content may be selected based on the requested web page or the web page of interest. To illustrate, any or both of the web pages may describe an item. Accordingly, the targeted content may include an advertisement about this item. Further, when provided to the user's computing device, the targeted content may be rendered in a space (e.g., a widget, a banner) of the requested web page or any other web page that the user may subsequently visit.

At operation 806, the user profile may be updated based on the association. For example, the tracking service may access the user profile based on the user ID and add the user characteristic to the user profile. If the user profile already contains the user characteristic, the respective likelihood may be updated (e.g., increased). In addition, the tracking service may associate the session ID with the added user characteristic. This may allow tracking the addition and frequencies of user characteristics over time by keeping track of what user characteristic(s) may have been observed in each computing session.

At operation 808, another computing session may exist. For example, the user (or the computing device) may have left and then revisited the web site. This new computing session may be associated with a new session ID and the same user ID. In addition, the user may request the same or a different web page during this new session. Accordingly, the tracking service may collect again data about the history of the user access to web pages of interest based on inserting respective URLs in the requested web page. In an example, the tracking service may insert a URL of interest based on the user profile. This selection may follow different approaches. In one approach, the tracking service may focus on a particular user characteristic. For instance, if the user profile indicates a particular user characteristic, the tracking service may select the URL of interest as one associated with metadata containing that user characteristic. This may allow the tracking service to further collect data about the user characteristic and update the respective likelihood accordingly. In another approach, the tracking service may diversify the data collection. For instance, if the user profile indicates a particular user characteristic, the tracking service may select a URL of interest that may correspond to another user characteristic. This may allow the collection of data about the other characteristic.

At operation 810, targeted content may be provided in the new computing session based on the user profile. For example, the tracking service may select targeted content based on a particular user characteristic from the user profile (e.g., one having the highest likelihood or having likelihood over a certain threshold). In another example, the tracking service may also consider the user characteristics as a function of the session ID. For instance, if the user profile indicates that a particular user characteristic may have been observed in only a number of recent computing sessions (e.g., in the last three sessions within an hour of the new computing session, the user browsed a particular camera model), the tracking service may determine that this user characteristic may be more relevant than other observed characteristics over time. Accordingly, the tracking service may select content targeted to that particular user characteristic (e.g., a discount applicable to purchasing the camera).

In addition to providing targeted content, user authentication may be provided as a service based on the user's history of access to web pages. This history may be used as a factor in the authentication along with the user ID. FIG. 9 illustrates an example flow for authenticating the user.

In particular, the example flow of FIG. 9 may start at operation 902, where a request for information may be received. For example, the user may operate the computing device and request a web page that may include the information. The request may be used as a trigger to authenticate the user based on different approaches.

In one approach, the trigger may be associated with a login web page. In other words, when the received request is for a login web page, that request may trigger the tracking service to use the history of accessed web pages as a factor in the authentication. This factor may be used in conjunction with other authentication factors. For example, the login web page may be configured to authenticate the user based on a username and a password. Further authenticating the user based on the history of accessed web pages may be an additional authentication factor.

In another approach, the trigger need not be the login web page. Instead, the trigger may be associated with any web page. In this approach, the user ID may be authenticated in conjunction with receiving a request for any web page of the service provider's web site. In this approach, if authenticated, the user may be given access to certain information or portions of the web site that would have been inaccessible otherwise.

At operation 904, a URL of another web page of the web site and a JavaScript may be inserted in the requested web page. This other web page may be a particular web page that may allow the authentication of the user (or user ID) based on the history of the web page accessed. Generally, the particular web page may be selected based on the user ID. For example, the particular web page may represent a web page unique to the user (or user ID) and/or that may have been accessed by or may be accessible to only the user. Different approaches may be used to select this particular web page. In one approach, the particular web page may represent a web page that may follow a successful authentication of the user through the login web page (e.g., one that may be accessed uniquely by the user after being authenticated through the login web page).

In another approach, the particular web page may be uniquely set-up for the user independently of the login web page. For example, the particular web page may have a particular URL. This URL may use (e.g., include or append) the user ID, a hash of the user ID, and/or a hash of information about the user (e.g., from the user account). This particular web page may only be accessible if the proper user ID was presented. Further, the particular web page may have been provided to and accessed by the user's computing device in a previous computing session. However, this access may be transparent to the user. For example, the particular web page may have been rendered in an invisible frame (e.g., one rendered in a window with a size set to zero, or one rendered outside a visible window).

Once the particular web page is selected, the respective URL may be inserted in the requested web page. In addition, the JavaScript may be configured to, upon execution, access the history of the computing device's browser (or any other application) to determine whether this URL may be found in the browser's history and/or the state or style information of the URL.

At operation 906, the requested web page may be provided to the computing device. As such, when this web page is rendered at the computing device, the JavaScript may be executed to determine whether the particular web page was accessed prior to providing the requested web page, and to generate an indication of this determination. The indication may be sent to the tracking service.

At operation 908, the indication may be received. For example, the tracking service may receive the indication based on the executed JavaScript accessing the browser's history.

At operation 910, the user (or user ID) may be authenticated based on the indication. Generally, if the indication indicates that the particular web page was previously accessed, the tracking service may authenticate the user (e.g., validate the user ID). Otherwise, the tracking service may determine that the user is unauthenticated. The authentication process may be based on the requested web page. For example, if the requested web page was the login web page, the indication may be used as one factor in the authentication process that may also include using the username and password. In another example, if the requested web page was not the login web page, the indication on its own may be sufficient to authenticate the user. In particular, the indication that the particular web page was previously accessed may represent that the user ID from this computing session may be the same user ID used in a previous computing session.

The tracking service may provide different services based on authenticating the user. Some of these services may relate to providing targeted content and/or detecting a web crawler. For example, an authenticated user may be provided access to targeted content (e.g., special deals) otherwise unavailable to an unauthenticated user. In another example, a computing device of an authenticated user may be identified as also being authenticated. For instance, an identifier of the computing device may be added to a list of trusted devices and/or to a list of devices associated with non-web crawlers.

The authentication process may include additional steps if the indication indicates that the particular web page was not previously accessed. In particular, this lack of access may not, in certain situations, accurately reflect that the particular web page was not previously accessed. For example, the user may have cleared the browser's history prior to the current computing session. In another example, the user may be a new user (e.g., one that recently opened a user account). As such, the authentication process may check for these situations.

For example, the JavaScript may be further configured to check the amount of the history (e.g., byte size) or the number of visited URLs in the history. If the amount or the number is below a threshold, the tracking service may nonetheless authenticate the user (e.g., based on the username and password). However, if the threshold is exceeded, the tracking service may not authenticate the user.

In another example, the authentication process may also include determining a time when the user account was generated. If that time is less than a threshold (e.g., the user account was recently opened), the tracking service may nonetheless authenticate the user (e.g., based on the username and password). Otherwise, the tracking service may not authenticate the user.

In addition to providing targeted content, an authenticating a user, detecting a web crawler may be provided as a service based on the user's history of access to web pages. In particular, the user may include the web crawler. For example, the web crawler may be hosted on the computing device and may be accessing web pages of the service provider's web site. FIG. 10 illustrates an example flow for detecting the web crawler.

In particular, the example flow of FIG. 10 may start at operation 1002, where a request for information may be received from the computing device. The information may be available from a web page of the service provider's website.

At operation 1004, a URL of another web page and a JavaScript may be inserted in the requested web page. The other web page may represent a particular web page of interest such that access to the particular web page may facilitate a determination of whether the computing device may be hosting the web crawler. Various approaches may be used to set-up and select this particular web page.

In one approach, the particular web page may be set up to be likely (e.g., with likelihood exceeding a threshold) accessible to the web crawler and likely inaccessible to non-web crawlers. In other words, the particular web page may be unique to web crawlers and may be a part of, for example, a botnet honeypot. Generally, a botnet honeypot may include one or more web pages, a web site, and/or underlying infrastructure (e.g., hosting computing system) that may appear to be part of a network, but that may actually be isolated and monitored. That network may contain information or a resource of value to web crawler such that the web crawler may likely access the network (e.g., one of the web pages). As such, if the particular web page was previously accessed under this approach, this previous access may indicate that the computing device may be hosting the web crawler.

In another approach, the particular web page may be set up to be likely (e.g., with likelihood exceeding a threshold) inaccessible to the web crawler and likely accessible to non-web crawlers. In other words, the particular web page may be unique to non-web crawlers. For example, the particular web page may represent a web page commonly or frequently accessed by non-web crawlers (e.g., a home page) and may belong to a certain portion of the web site. A robots exclusion protocol of the web site may identify that portion of the web site, including the particular web page, to be inaccessible to web crawlers. As such, while frequently accessed by non-web crawlers, the web crawler may unlikely access this particular web page. Under this approach, if the particular web page was not previously accessed, the lack of the previous access may indicate that the computing device may be hosting the web crawler.

The tracking service may select the particular web page and, accordingly, insert the corresponding URL in the requested web page. In addition, the tracking service may insert the JavaScript. The JavaScript may be configured to, upon execution, access the history of the computing device's browser (or any other application implementing a web crawler) to determine whether this URL may be found in the browser's history and/or the state or style information of the URL.

At operation 1006, the requested web page may be provided to the computing device. This may cause the execution of the JavaScript. In turn, an indication of whether the particular web page was accessed prior to providing the requested web page may be generated. The indication may be sent to the tracking service.

At operation 1008, the indication may be received. For example, the tracking service may receive the indication based on the execution of the JavaScript.

At operation 1010, the web crawler may be detected based on the indication. This detection may also depend on the approach implemented to select the particular web page. For example, if the particular web page was unique to the web crawler, and if the indication indicates that this particular web page was previously accessed, the tracking service may detect the web crawler. In another example, if the particular web page was unique to non-web crawlers, and if the indication indicates that this particular web page was not previously accessed, the tracking service may detect the web crawler.

In addition, in conjunction with or subsequent to detecting the web crawler, the web service may implement additional sub-operations to further validate the detection. For example, the tracking service may update the JavaScript or insert another JavaScript in the same requested web page or in another web page provided to the computing device. The updated or new JavaScript may be configured to execute after a time delay (e.g., a number of seconds) and check access to any web page (e.g., a commonly accessed web page). Typically, the web crawler may scrap the web page in less time than the time delay. Accordingly, the web crawler may not execute this JavaScript. Thus, not receiving an indication based on this JavaScript may indicate that the computing device may be hosting the web crawler. Conversely, if an indication is received about the web page having been accessed, the tracking service may detect a non-web crawler. In another example, an additional URL may be inserted. As inserted, the additional URL may be configured to be rendered as an image. Typically, the web crawler may use a headless browser that may not render images. Accordingly, the web crawler may not follow the additional URL and may not access a corresponding web page. Thus, not receiving a request for the corresponding web page may indicate that the computing device may be hosting the web crawler.

Once the web crawler is detected, the tracking service may perform additional actions associated with this user characteristic (e.g., being a web crawler). Generally, these additional actions may alleviate or support managing the network traffic to the web site such that the experience of non-web crawlers may be improved. For example, the requested information (as described at operation 1002) or a portion thereof may be provided through a particular network path. In particular, the information may be provided from a source (e.g., a proxy server) or through a programming application interface (API) different from the one used to provide information to non-crawler. In another example, a subset rather than the entire information may be provided. For example, text but not image data may be provided.

Figure 11:
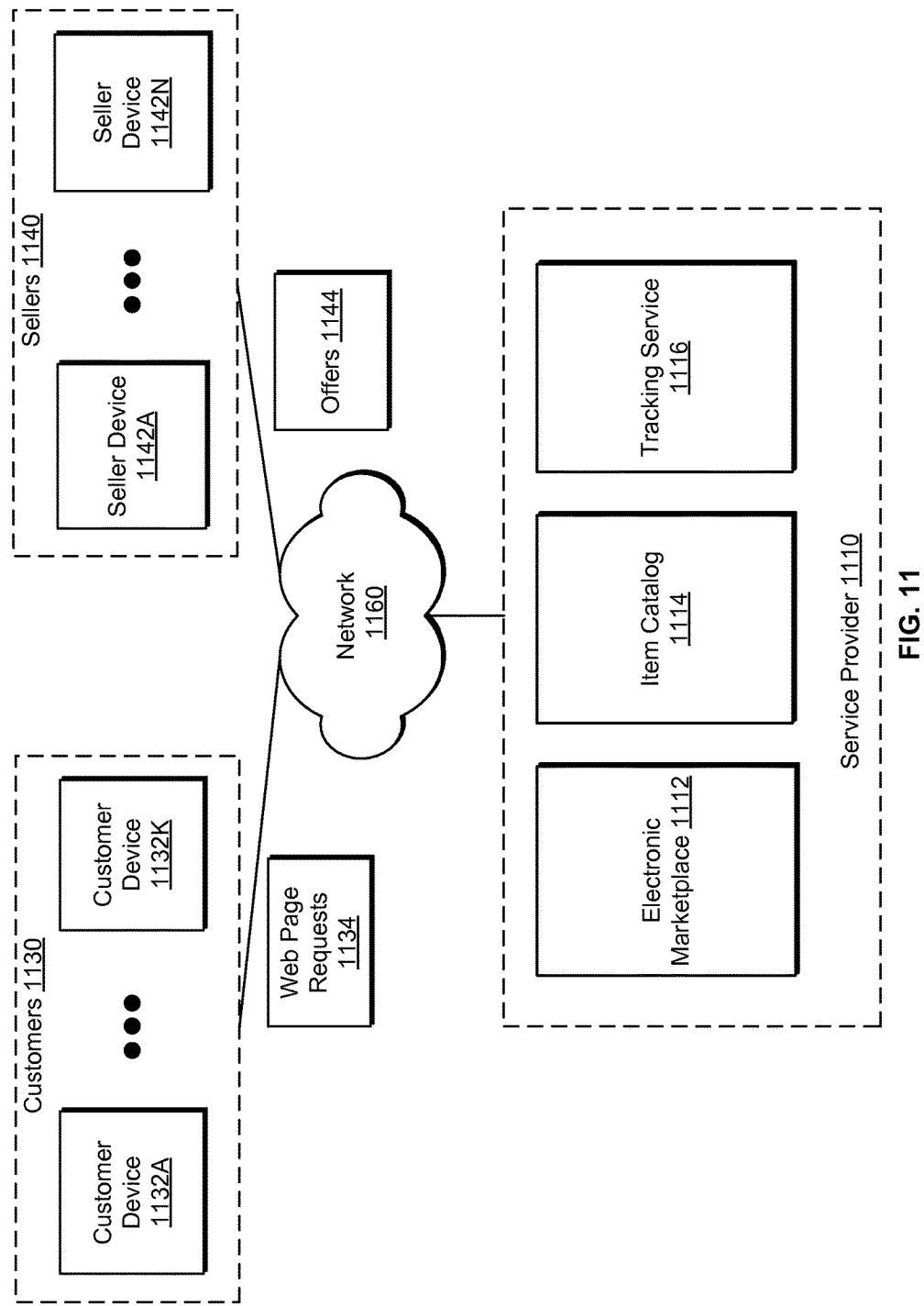
FIG. 11 illustrates an example network environment for offering items, according to embodiments.

Monitoring a history of accesses to web pages may enable providing various services to a user. Such monitoring and service providing may be implemented as a part of an electronic marketplace offering items to the users. FIG. 11 illustrates an example environment of an electronic marketplace.

In particular, a service provider 1110 of an electronic marketplace 1112 may implement a tracking service 1116, similar to the tracking service 140, on a computing system. The tracking service 1116 may be configured to classify a user and provide a service based on the classification.

In an embodiment, the electronic marketplace 1112 may provide a web site, to access information about the offered items. The electronic marketplace 1112 may also provide an electronic platform to offer the items and to maintain information about the items and the offers. For example, the offered items may be cataloged in an item catalog 1114. The item catalog 1114 may represent a data structure describing the information about the items. An item may be associated with one or more pages of the item catalog 1114, where the page(s) may describe attributes of the item, the offer, and other information associated with offering the item at the electronic marketplace 1112.

A web page of the electronic marketplace 1112 may be associated with an item. The web page may use information from the item catalog 1114. In an example, the web page may allow sellers 1140 and/or the service provider 1110 to define offers of items. For instance, the sellers 1140 may list offers 1144. The provided information may be added to the item catalog 1114. The web page may also allow customers 1130 to review the information available from the item catalog 1114 (e.g., offers) and make order or purchase decisions. The customers 1130 may, for example, submit web page request 1134 to view information about items, make purchase decisions, and conduct various transactions.

In response to a customer's request for a web page, the tracking service 1116 may select and insert URLs of web pages of interest and a JavaScript configured to determine whether any of these URLs may have been previously accessed. The web page may be provided to the customer (or the customer's computing device) for rendering. When rendered, an indication of the previous access may be received by the tracking service 1116. Accordingly, the tracking service may classify the customer and perform an action.

As such, the service provider 1110 may operate the electronic marketplace 1112 to facilitate interactions between the service provider 1110, the customers 1130, and the sellers 1140 over a network 1160. Each one of the sellers 1140 may operate one or more seller devices 1142A-N to access the electronic marketplace 1112 and perform various seller-related functions. A customer may be an item recipient, a buyer, or any user reviewing, browsing, ordering, obtaining, purchasing, or returning an item of a seller. Each one of the customers 1130 may operate one or more customer devices 1132A-K to access the electronic marketplace 1112 and perform various customer-related functions. By implementing the tracking service 1116, the service provider 1110 may automatically classify a customer and provide a respective service.

Figure 12:
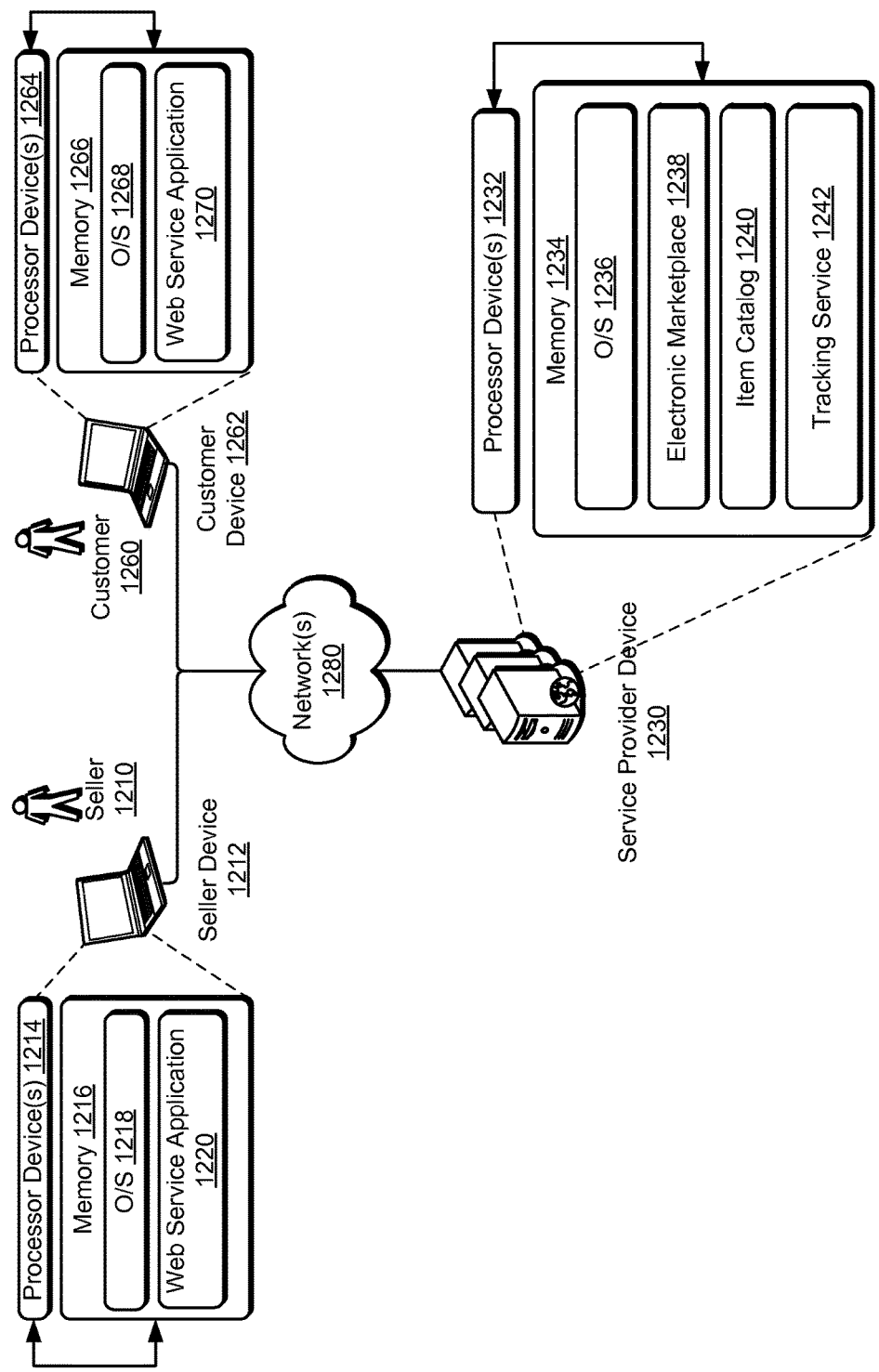
FIG. 12 illustrates an example architecture for providing a network-based service, including at least one user device and/or one or more service provider devices connected via one or more networks, according to embodiments.

Turning to FIG. 12, that figure illustrates an example end-to-end computing environment for a history of accesses to web pages may enable providing various services to a user. In this example, a service provider may implement a tracking service to provide various services associated with offering items. The items may be offered at an electronic marketplace by a seller 1210 and/or the service provider and may be available for ordering by a customer 1260.

In a basic configuration, the seller 1210 may utilize a seller device 1212 to access local applications, a web service application 1220, a seller account accessible through the web service application 1220, a web site or any other network-based resources via one or more networks 1280. In some aspects, the web service application 1220, the web site, and/or the seller account may be hosted, managed, and/or otherwise provided by one or more computing resources of the service provider, such as by utilizing one or more service provider devices 1230. The seller 1210 may use the local applications and/or the web service application 1220 to interact with the network-based resources of the service provider and perform seller-related transactions. These transactions may include, for example, offering items for sale. Some or all of these transactions may use web pages of the service provider.

In some examples, the seller device 1212 may be any type of computing devices such as, but not limited to, a mobile phone, a smart phone, a personal digital assistant (PDA), a laptop computer, a thin-client device, a tablet PC, etc. In one illustrative configuration, the seller device 1212 may contain communications connection(s) that allow the seller device 1212 to communicate with a stored database, another computing device or server, seller terminals, and/or other devices on the networks 1280. The seller device 1212 may also include input/output (I/O) device(s) and/or ports, such as for enabling connection with a keyboard, a mouse, a pen, a voice input device, a touch input device, a display, speakers, a printer, etc.

The seller device 1212 may also include at least one or more processing units (or processor device(s)) 1214 and one memory 1216. The processor device(s) 1214 may be implemented as appropriate in hardware, computer-executable instructions, firmware, or combinations thereof. Computer-executable instructions or firmware implementations of the processor device(s) 1214 may include computer-executable or machine-executable instructions written in any suitable programming language to perform the various functions described.

The memory 1216 may store program instructions that are loadable and executable on the processor device(s) 1214, as well as data generated during the execution of these programs. Depending on the configuration and type of seller device 1212, the memory 1216 may be volatile (such as random access memory (RAM)) and/or non-volatile (such as read-only memory (ROM), flash memory, etc.). The seller device 1212 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 1216 may include multiple different types of memory, such as static random access memory (SRAM), dynamic random access memory (DRAM), or ROM.

Turning to the contents of the memory 1216 in more detail, the memory may include an operating system (O/S) 1218 and the one or more application programs or services for implementing the features disclosed herein including the web service application 1220. In some examples, the seller device 1212 may be in communication with the service provider devices 1230 via the networks 1280, or via other network connections. The networks 1280 may include any one or a combination of many different types of networks, such as cable networks, the Internet, wireless networks, cellular networks, and other private and/or public networks. While the illustrated example represents the seller 1210 accessing the web service application 1220 over the networks 1280, the described techniques may equally apply in instances where the seller 1210 interacts with the service provider devices 1230 via the seller device 1212 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 1260 may utilize customer device 1262 to access local applications, a web service application 1270, a customer account accessible through the web service application 1270, a web site, or any other network-based resources via the networks 1280. In some aspects, the web service application 1270, the web site, and/or the user account may be hosted, managed, and/or otherwise provided by the service provider devices 1230 and may be similar to the web service application 1220, the web site accessed by the computing device 1212, and/or the seller account, respectively.

The customer 1260 may use the local applications and/or the web service application 1270 to conduct transactions with the network-based resources of the service provider. These transactions may include, for example, browsing for items, viewing items, ordering items, reviewing items, returning items, and/or other transactions. Some or all of these transactions may use web pages of the service provider.

In some examples, the customer device 1262 may be configured similarly to the seller device 1212 and may include at least one or more processing units (or processor device(s)) 1264 and one memory 1266. The processor device(s) 1264 may be implemented as appropriate in hardware, computer-executable instructions, firmware, or combinations thereof similarly to the processor device(s) 1214. Likewise, the memory 1266 may also be configured similarly to the memory 1216 and may store program instructions that are loadable and executable on the processor device(s) 1264, as well as data generated during the execution of these programs. For example, the memory 1266 may include an operating system (O/S) 1268 and the one or more application programs or services for implementing the features disclosed herein including the web service application 1270.

As described briefly above, the web service applications 1220 and 1270 may allow the seller 1210 and customer 1260, respectively, to interact with the service provider devices 1230 to conduct transactions involving items. The service provider devices 1230, perhaps arranged in a cluster of servers or as a server farm, may host the web service applications 1220 and 1270. These servers may be configured to host a web site (or combination of web sites) viewable via the computing devices 1212 and 1262. Other server architectures may also be used to host the web service applications 1220 and 1270. The web service applications 1220 and 1270 may be capable of handling requests from many sellers 1210 and customers 1260, respectively, and serving, in response, various interfaces that may be rendered at the computing devices 1212 and 1262 such as, but not limited to, a web site. The web service applications 1220 and 1270 may interact with any type of web site that supports interaction, including social networking sites, electronic retailers, informational sites, blog sites, search engine sites, news and entertainment sites, and so forth. As discussed above, the described techniques may similarly be implemented outside of the web service applications 1220 and 1270, such as with other applications running on the computing devices 1212 and 1262, respectively.

The service provider devices 1230 may, in some examples, provide network-based resources such as, but not limited to, applications for purchase and/or download, web sites, web hosting, client entities, data storage, data access, management, virtualization, etc. The service provider devices 1230 may also be operable to provide web hosting, computer application development, and/or implementation platforms, or combinations of the foregoing to the seller 1210 and customer 1260.

The service provider devices 1230 may be any type of computing device such as, but not limited to, a mobile phone, a smart phone, a personal digital assistant (PDA), a laptop computer, a desktop computer, a server computer, a thin-client device, a tablet PC, etc. The service provider devices 1230 may also contain communications connection(s) that allow service provider devices 1230 to communicate with a stored database, other computing devices or servers, seller terminals, and/or other devices on the network 1280. The service provider devices 1230 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 1230 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 1230 may be in communication with the computing devices 1212 and 1262 via the networks 1280, or via other network connections. The service provider devices 1230 may include one or more servers, perhaps arranged in a cluster, or as individual servers not associated with one another.

In one illustrative configuration, the service provider devices 1230 may include at least one or more processing units (or processor devices(s)) 1232 and one memory 1234. The processor device(s) 1232 may be implemented as appropriate in hardware, computer-executable instructions, firmware, or combinations thereof. Computer-executable instruction or firmware implementations of the processor device(s) 1232 may include computer-executable or machine-executable instructions written in any suitable programming language to perform the various functions described.

The memory 1234 may store program instructions that are loadable and executable on the processor device(s) 1232, as well as data generated during the execution of these programs. Depending on the configuration and type of the service provider devices 1230, the memory 1234 may be volatile (such as random access memory (RAM)) and/or non-volatile (such as read-only memory (ROM), flash memory, etc.). The service provider devices 1230 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1234 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 1234 in more detail, the memory may include an operating system (O/S) 1236, code for an electronic marketplace 1238, data related to an item catalog 1240, and code for a tracking service 1242. Although FIG. 12 illustrates the various data as stored in the memory 1234, this data or portion of the data may be additionally or alternatively stored at a storage device remotely accessible to the service provider devices 1230.

Figure 13:
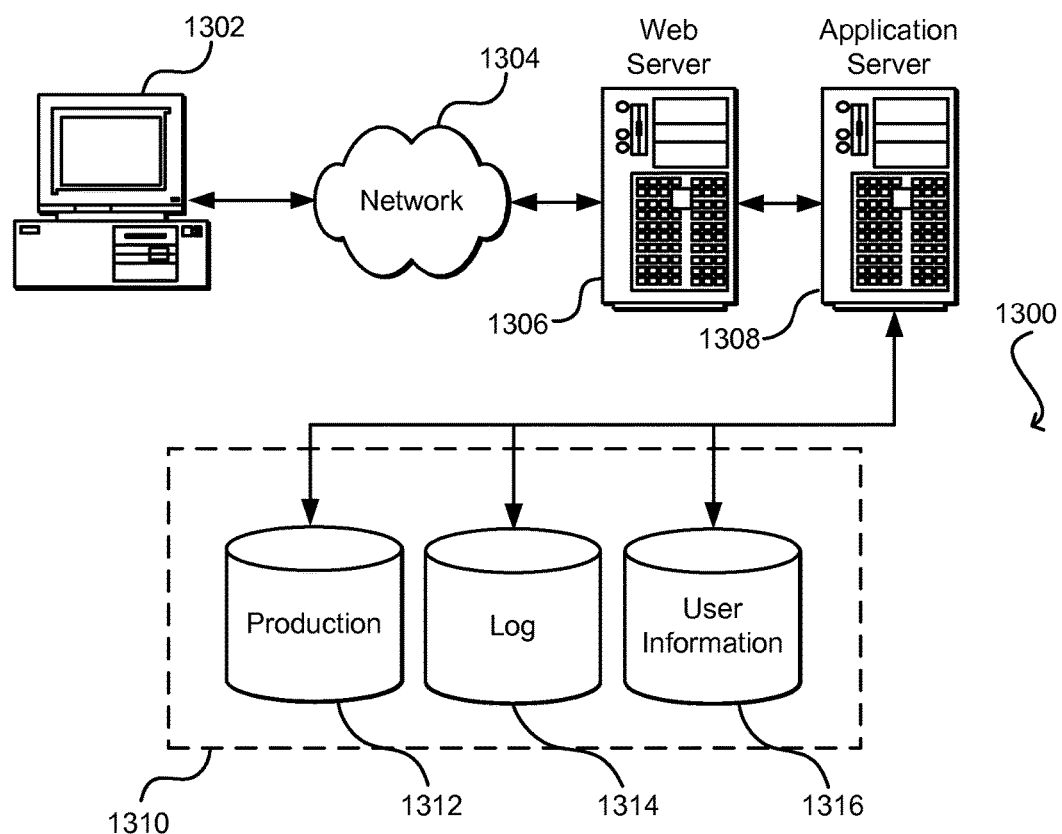
FIG. 13 illustrates an environment in which various embodiments may be implemented.

Turning to FIG. 13, the figure illustrates aspects of an example environment 1300 capable of implementing the above-described structures and functions. As will be appreciated, although a Web-based environment is used for purposes of explanation, different environments may be used, as appropriate, to implement various embodiments. The environment includes an electronic client device 1302, which may include any appropriate device operable to send and receive requests, messages, or information over an appropriate network(s) 1304 and convey information back to a user of the device. Examples of such client devices include personal computers, cell phones, handheld messaging devices, laptop computers, set-top boxes, personal data assistants, electronic book readers, or any other computing device. The network(s) 1304 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 1308 provides access control services in cooperation with the data store 1310, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1302 and the application server 1308, may be handled by the Web server 1306. It should be understood that the Web and application servers 1306 and 1308 are not required and are merely example components, as structured code discussed herein may be executed on any appropriate device or host machine as discussed elsewhere herein.

The data store 1310 may include several separate data tables, databases or other data storage mechanisms and media for storing data relating to a particular aspect. For example, the data store 1310 illustrated includes mechanisms for storing production data 1312 and user information 1316, which may be used to serve content for the production side. The data store 1310 is also shown to include a mechanism for storing log data 1314, which may be used for reporting, analysis, or other such purposes. It should be understood that there may be many other aspects that may need to be stored in the data store 1310, such as for page image information and to access correct information, which may be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 1302. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of environment 1300 in FIG. 13 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, by a computer system associated with an electronic marketplace of a service provider, a collection of universal resource locators (URLs) and metadata, the URLs corresponding to web pages of one or more other service providers, the metadata describing user characteristics that are associated with user accesses to the web pages and that comprise an authenticated user characteristic;
   receiving, by the computer system from a computing device of a user, a request for information about an item offered with the electronic marketplace;
   inserting, by the computer system in a first web page of the electronic marketplace, code and a first URL from the collection, the first web page comprising the information, the first URL corresponding to a second web page of the web pages, the code, upon execution, configured to determine a presence or absence of the first URL in a browser history of the computing device;
   providing, by the computer system, the first web page to the computing device based at least in part on the request for the information;
   receiving, by the computer system from the computing device, an indication that the second web page was accessed prior to providing the first web page, the indication received based at least in part on a determination of the presence of the first URL in the browser history of the computing device, the determination based at least in part on an execution of the code at the computing device;
   associating, by the computer system, the user with the authenticated user characteristic based at least in part on the indication; and
   providing, by the computer system, targeted content to the computing device based at least in part on associating the user with the authenticated user characteristic, wherein the targeted content is available from the electronic marketplace.

2. The computer-implemented method of claim 1, wherein the browser history comprises the first URL and one or more of state or style attribute of the first URL, and wherein the code is configured to generate the indication based at least in part on the one or more of state or style attribute.

3. One or more non-transitory computer-readable media comprising instructions that, when executed with one or more processors, cause a system to at least:
   maintain a set of universal resource locators (URLs) of web pages and metadata that comprises an authenticated user characteristic;
   receive, from a user computing system, a request for a first web page comprising information about an item;
   insert, in the first web page, code and a URL of a second web page of the web pages, the code, upon execution, configured to determine a presence or absence of the URL in a browser history;
   provide, to the user computing system, the first web page based at least in part on the request;
   determine an indication that the second web page was accessed prior to providing the first web page, the indication determined, upon an execution of the code at the user computing system, based at least in part on the presence of the URL in the browser history;

associate the user computing system with an authenticated user characteristic based at least in part on the indication; and provide, to the user computing system, targeted content based at least in part on the user computing system being associated with the authenticated user characteristic.

4. The one or more non-transitory computer-readable media of claim 3, wherein the item is available for ordering from an electronic marketplace of a first service provider, wherein the first web page describes the item, wherein the second web page is associated with a second service provider and describes the item.

5. The one or more non-transitory computer-readable media of claim 3, wherein the browser history is associated with an application hosted on the user computing system, and wherein the browser history comprises the URL based at least in part on an access of the application to the second web page prior to the providing of the first web page.

6. The one or more non-transitory computer-readable media of claim 5, wherein the code comprises statements of a programmatic scripting language in accordance with an ECMAScript standard, and wherein the statements are configured to generate the indication based at least in part on one or more of state or style attribute of the URL from the browser history.

7. The one or more non-transitory computer-readable media of claim 3, wherein the metadata comprises a likelihood of the user having the authenticated user characteristic based at least in part on the second web page having been accessed.

8. The one or more non-transitory computer-readable media of claim 7, wherein the information of the first web page describes the item as available from a first source, wherein the second web page describes the item as available from a second source, and wherein the likelihood is generated based at least in part on historical data associated with user accesses to the first web page.

9. The one or more non-transitory computer-readable media of claim 3, wherein the URL is inserted in the first web page such that, upon rendering the first web page at the user computing system, the URL and the second web page are not rendered to the user.

10. A system comprising:
one or more processors;
one or more computer-readable media comprising instructions that, when executed with the one or more processors, cause the system to at least:
maintain a set of universal resource locators (URLs) of web pages and metadata that comprises an authenticated user characteristic;
receive, from a computing system of a user, a request for a first web page comprising information about an item;
add, to the first web page, and based at least in part on the request, code and a URL of a second web page of the web pages, the code configured at least to, upon execution at the computing system, determine a presence of the URL in a browser history stored at the computing system;
provide the first web page to the computing system based at least in part on the request;
receive, from the computing system, an indication that the second web page was accessed prior to providing the first web page to the computing system, the indication received, upon an execution of the code at the computing system, based at least in part on the presence of the URL;
associate the user with an authenticated user characteristic based at least in part on the indication; and
provide, to the computing system, targeted content associated with a provider of the first web page based at least in part on the user being associated with the authenticated user characteristic.

11. The system of claim 10, wherein the first web page and the second web page describe the item, and wherein the targeted content is about the item and is available from a source of a provider associated with the first web page.

12. The system of claim 11, wherein providing the targeted content comprises: causing, upon rendering the first web page, the computing system to also render the targeted content in a presentation space of the first web page.

13. The system of claim 10, wherein associating the user with the authenticated user characteristic comprising updating a profile of the user to include the authenticated user characteristic.

14. The system of claim 13, wherein the targeted content is selected from a collection of content based at least in part on the profile of the user.

15. The system of claim 13, wherein the URL is added to the first web page based at least in part on a selection of the second web page from the set, and wherein the selection is based at least in part on the profile.

16. The system of claim 10, wherein associating the user with the authenticated user characteristic comprises: associating, with the authenticated user characteristic, one or more of an identifier of the user or an identifier of a computing session between the system and the computing system, and wherein the targeted content is selected from a collection of content based at least in part on the one or more of: the identifier of the user or the identifier of the computing session.

17. The system of claim 10, wherein the second web page describes the item as available from a source of a provider, wherein the URL is added to the first web page based at least in part on a selection of the second web page from the set, and wherein the selection is based at least in part on one or more of: the item or the provider.

18. The computer-implemented method of claim 1, further comprising:
inserting, by the computer system in the first web page, a second URL of an image; and
determining, by the computer system, that a request was received from the computing device for the image based at least in part on providing the first web page to the computing device and on the code following the second URL, wherein the user is associated with the authenticated user characteristic further based at least in part on the request for the image.

19. The computer-implemented method of claim 1, further comprising:
inserting, by the computer system in the first web page of the electronic marketplace, second code configured to execute after a predefined time delay relative to providing the first web page to the computing device, wherein execution of the second code comprises accessing an additional web page; and
determining, by the computer system, that the additional web page was accessed by the computing device based at least in part on the execution of the code after elapse of the predefined time delay, and wherein the user is associated with the authenticated user characteristic further based at least in part on the additional web page being accessed.

\* \* \* \* \*